US012798617B2

(12) United States Patent
Di Cairano et al.

(10) Patent No.: US 12,798,617 B2
(45) Date of Patent: Nov. 17, 2026

(54) SYSTEM AND METHOD SUITABLE FOR CONTROLLING MOTION OF AN EGO VEHICLE IN AN ENVIRONMENT INCLUDING OTHER MOVING AGENTS

(71) Applicant: Mitsubishi Electric Research Laboratories, Inc., Cambridge, MA (US)

(72) Inventors: Stefano Di Cairano, Newton, MA (US); Karl Berntorp, Newton, MA (US); Andres Chavez Armijos, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 71 days.

(21) Appl. No.: 18/933,559

(22) Filed: Oct. 31, 2024

(65) Prior Publication Data

US 2025/0388234 A1 Dec. 25, 2025

Related U.S. Application Data

(60) Provisional application No. 63/663,337, filed on Jun. 24, 2024.

(51) Int. Cl.
*B60W 60/00* (2020.01)

(52) U.S. Cl.
CPC . *B60W 60/0015* (2020.02); *B60W 2554/4046* (2020.02); *B60W 2556/45* (2020.02)

(58) Field of Classification Search
CPC ..... B60W 60/0015; B60W 2554/4046; B60W 2556/45
USPC ........ 701/25
See application file for complete search history.

(56) References Cited

U.S. PATENT DOCUMENTS

| | | | | |
|---|---|---|---|---|
| 11,377,118 B2 * | 7/2022 | Fuchs | ............... | B60W 60/0027 |
| 2022/0097690 A1 * | 3/2022 | Dede | .................. | G01C 21/3461 |
| 2023/0030104 A1 * | 2/2023 | Puchkarev | ........ | B60W 50/0205 |
| 2023/0399002 A1 * | 12/2023 | Sumer | .................. | B60W 40/13 |
| 2025/0058802 A1 * | 2/2025 | Chen | ................ | B60W 60/0027 |

* cited by examiner

*Primary Examiner* — Isaac G Smith
(74) *Attorney, Agent, or Firm* — Gene Vinokur

(57) ABSTRACT

The present disclosure provides a system and a method for controlling an ego vehicle (EV) in an environment surrounding the EV and including at least one other agent (OA) representing a moving object. The method includes determining an independent trajectory for the EV independent from motion of the at least one OA based on a state of the EV, and an independent trajectory for the at least one OA independent from motion of the EV based on a state of the at least one OA. The method further includes determining jointly and interdependently joint trajectories of the EV and the at least one OA by optimizing a cost function of a difference between the joint trajectories and the independent trajectories. The method further includes controlling the motion of the EV based on the joint trajectory of the EV.

20 Claims, 27 Drawing Sheets

SYSTEM AND METHOD SUITABLE FOR CONTROLLING MOTION OF AN EGO VEHICLE IN AN ENVIRONMENT INCLUDING OTHER MOVING AGENTS

TECHNICAL FIELD

The present disclosure relates generally to control systems, and more specifically to a system and a method suitable for controlling motion of an ego vehicle in an environment including other moving agents.

BACKGROUND

Motion prediction is a key component for autonomous driving and advanced driver-assistance systems (ADAS) of a vehicle. A critical component of these systems is a motion planner, which gathers data about the vehicle's surroundings through object detection sensors of the vehicle. The object detection sensors utilize various technologies, including short-range radar, long-range radar, cameras with image processing, Light Detection and Ranging (LiDAR), and ultrasound. The object detection sensors are configured to detect other vehicles/objects present in the surrounding the vehicle.

Based on the data about the surrounding of the vehicle, the motion planner computes a trajectory for the vehicle to navigate towards a goal location in presence of the other vehicles. However, as the vehicle moves according to the trajectory to navigate towards the goal location, motion of the other vehicles is affected and results in change in the motion of the other vehicles. Such a change in the motion of the other vehicles present around the vehicle imposes limitation on the motion of the vehicle.

Therefore, there is still a need for an improved system and method for controlling motion of the vehicle in presence of the other vehicles.

SUMMARY

It is an object of some embodiments to a system and a method for controlling motion of an ego vehicle (EV) in an environment that includes other agents. It is also an object some embodiment to control the motion of the EV in the environment that includes the other agents, by taking into account reaction of the other agents to the motion of the EV. The EV is an autonomous vehicle or a semi-autonomous vehicle. Further, as used herein, the EV is an autonomous car, a drone, or an autonomous mobile robot. As used herein, the other agents (OAs) are other vehicles, other robots, other flying devices, bicycles, pedestrians, and/or other moving objects.

The EV includes a controller which relies on onboard or remote-connected sensing for acquiring information on the environment. Based on the acquired information, the controller predicts future behavior of the OAs, and determines a trajectory that the EV executes. Such a trajectory must account for (i) an objective of motion of the EV, (ii) existing constraints to the EV motion due to regulation and physical limitations, and (iii) limitations posed on the EV motion by motion of the OAs.

To predict the future behavior of the OAs, trajectories of the OAs need to be determined. Some embodiments are based on the recognition that the trajectories of the OAs are determined independently of the motion of the EV or the trajectory of the EV. This is because the EV and the OAs have different and often competing objectives, which results in solving a multi-objective optimization problem in real time and with a partially unknown optimization structure. Interdependence of the motion of the EV and the OAs is not taken into account. While the independent determination of the trajectories is sufficient for some control problems, in other scenarios, e.g., in a case of dense traffic when the objectives of the EV and the OAs are competing, such an approach is not practical.

For instance, when the motion of the EV needs to merge into a lane with dense traffic, the EV tries to stay far away from the trajectories of the OAs to help maintaining independence of the motions of the OAs. Staying away from the OAs means the EV never merges, or only merge in far future. On the other hand, as the EV merges, some OAs make room for it and some others do not.

To that end, it is an object of some embodiments to consider the interdependency of the motions of the EV and the OAs on each other to better plan the motion of the EV.

Some embodiments are based on the realization, to achieve such an objective, the trajectory of the EV and the trajectories of the OAs can be determined jointly and interdependently by taking into account reaction of the OAs to the motion of the EV. Some embodiments are based on the realization that the reaction of the OAs are driven by a first component that is due to safety of the OAs with respect to the motion of the EV and a second component that is due to a desire to still accomplish the OAs' objectives despite the motion of the EV. The first component amounts to a safety constraint that the OAs and the EV must jointly enforce, and the second component amounts to a cost function that the EV and OAs jointly optimize.

Some embodiments are based on the realization that the safety constraint and the cost function include parameters that represent actual behavior of the OAs. Such parameters are different for each other agents and are not initially known. Some embodiments are based on the realization that the parameters can be learned based on a difference between expected and observed reactions of the OAs to the motion of the EV, where such a difference is used to adjust current values of the parameters to produce updated values of the parameters.

To this end, the controller determines jointly and interdependently the trajectory of the EV and the trajectories of the OAs by solving an optimization problem where the cost function is optimized and the safety constraints are enforced, using the current values of the parameters. The trajectory of the EV is then executed, and the trajectories of the OAs are used to predict the motion of the OAs according to the current values of the parameters. Then, the OAs' motion is observed, and a difference between the observed motion and the predicted trajectories of the OAs is used to update the values of the current parameters for future decisions of the controller.

Accordingly, one embodiment discloses a controller for controlling an ego vehicle (EV) in an environment surrounding the EV and including at least one other agent (OA) representing a moving object. The controller comprises a processor coupled with instructions stored in a memory, wherein the stored instructions, when executed by the processor, cause the controller to: collect a state of the EV and a state of the at least one OA; determine an independent trajectory for the EV independent from motion of the at least one OA based on the state of the EV, and an independent trajectory for the at least one OA independent from motion of the EV based on the state of the at least one OA; determine jointly and interdependently trajectories for the motion of the EV and the at least one OA to produce joint trajectories of the EV and the at least one OA by optimizing a cost function of a difference between the joint trajectories and the independent trajectories; and control the motion of the EV based on the joint trajectory of the EV.

Accordingly, another embodiment discloses a method for controlling an ego vehicle (EV) in an environment surrounding the EV and including at least one other agent (OA) representing a moving object. The method comprises collecting a state of the EV and a state of the at least one OA; determining an independent trajectory for the EV independent from motion of the at least one OA based on the state of the EV, and an independent trajectory for the at least one OA independent from motion of the EV based on the state of the at least one OA; determining jointly and interdependently trajectories for the motion of the EV and the at least one OA to produce joint trajectories of the EV and the at least one OA by optimizing a cost function of a difference between the joint trajectories and the independent trajectories; and controlling the motion of the EV based on the joint trajectory of the EV.

Accordingly, yet another embodiment discloses a non-transitory computer-readable storage medium embodied thereon a program executable by a processor for performing a method for controlling an ego vehicle (EV) in an environment surrounding the EV and including at least one other agent (OA) representing a moving object. The method comprises collecting a state of the EV and a state of the at least one OA; determining an independent trajectory for the EV independent from motion of the at least one OA based on the state of the EV, and an independent trajectory for the at least one OA independent from motion of the EV based on the state of the at least one OA; determining jointly and interdependently trajectories for the motion of the EV and the at least one OA to produce joint trajectories of the EV and the at least one OA by optimizing a cost function of a difference between the joint trajectories and the independent trajectories; and controlling the motion of the EV based on the joint trajectory of the EV.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms “for example,” “for instance,” and “such as,” and the verbs “comprising,” “having,” “including,” and their other verb forms, when used in conjunction with a listing of one or more components or other items, are each to be construed as open ended, meaning that that the listing is not to be considered as excluding other, additional components or items. The term “based on” means at least partially based on.

Further, it is to be understood that the phraseology and terminology employed herein are for the purpose of the description and should not be regarded as limiting. Any heading utilized within this description is for convenience only and has no legal or limiting effect.

Figure 1A:
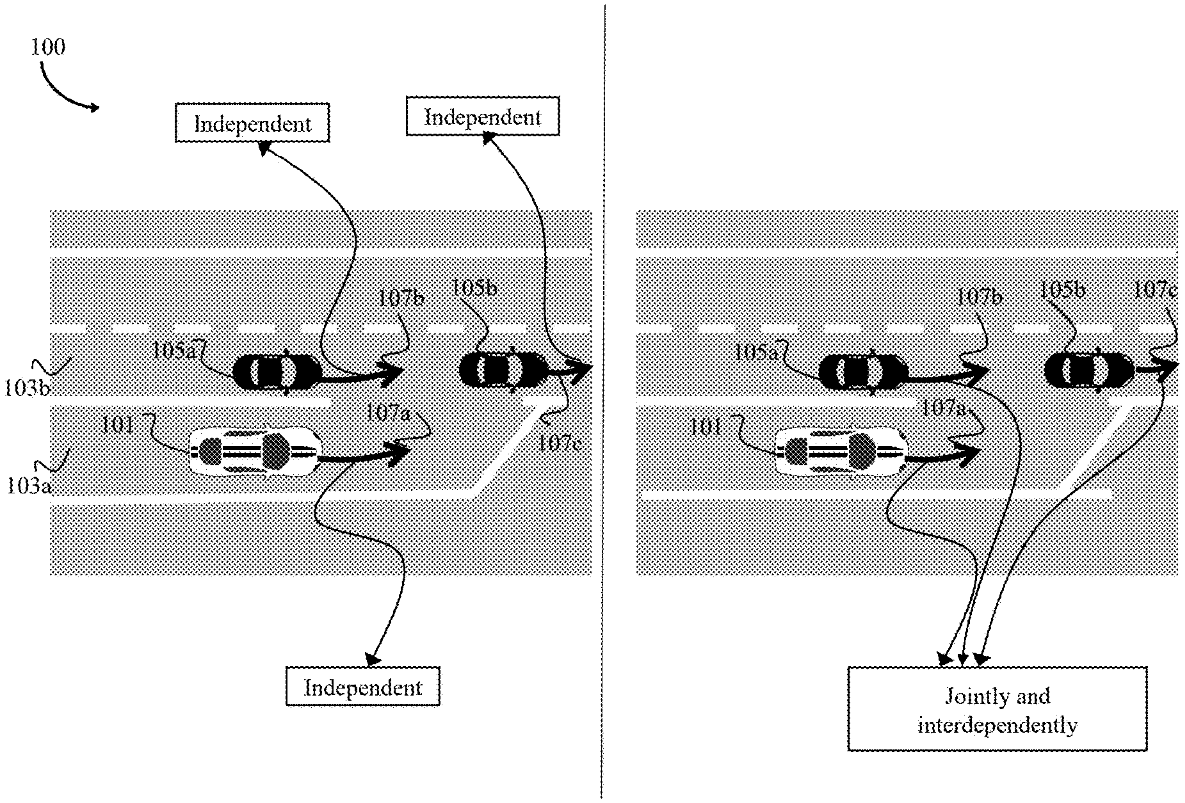
FIG. 1A illustrates an environment where an ego vehicle (EV) is operating, according to an embodiment of the present disclosure.

FIG. 1A illustrates an environment 100 where an ego vehicle (EV) 101 is operating, according to an embodiment of the present disclosure. The EV 101 is an autonomous vehicle or a semi-autonomous vehicle. Further, as used herein, the EV 101 is an autonomous car, a drone, or an autonomous mobile robot, and operating in the environment 100 that is occupied by other "agents", such as other vehicles, other robots, other flying devices, bicycles, pedestrians, and/or other moving objects. For the purpose of explanation, the EV 101 is considered to be an autonomous car traversing along a lane 103*a* in the environment 100. The EV 101 is surrounded by other agents (OAs) 105*a* and 105*b* that are traversing along a lane 103*b*.

It is an object of some embodiments to control a motion of the EV 101 in presence of the other agents 105*a* and 105*b*. The EV 101 includes a controller which relies on onboard or remote-connected sensing for acquiring information on the environment 100. Based on the acquired information, the controller predicts future behavior of the OAs 105*a* and 105*b*, and determines a trajectory 107*a* that the EV 101 executes. Such a trajectory must account for (i) an objective of motion of the EV 101, (ii) existing constraints to the EV motion due to regulation and physical limitations, and (iii) limitations posed on the EV motion by motion of the OAs 105*a* and 105*b*.

To predict the future behavior of the OAs 105*a* and 105*b*, trajectories 107*b* and 107*c* of the OAs 105*a* and 105*b*, respectively, need to be determined. Some embodiments are based on the recognition that the trajectories 107*b* and 107*c* are determined independently of the motion of the EV 101 or the trajectory 107*a* of the EV 101. This is because the EV 101 and the OAs 105*a* and 105*b* have different and often competing motion objectives, which results in solving a multi-objective optimization problem in real time and with a partially unknown optimization structure. Interdependence of the motion of the EV 101 and the OAs 105*a* and 105*b* is not taken into account. While such an independent determination of the trajectories is sufficient for some control problems, in other scenarios, e.g., in a case of dense traffic when the objective of the EV 101 and the OAs 105*a* and 105*b* are competing, such an approach is not practical.

For instance, when the motion of the EV 101 needs to merge into the lane 103*b* with dense traffic, the EV 101 tries to stay far away from the trajectories 107*b* and 107*c* to help maintaining independence of the motions of the OAs 105*a* and 105*b*. Staying away from the OAs 105*a* and 105*b* means the EV 101 never merges, or only merge in far future. On the other hand, as the EV 101 merges, some OAs make room for it and some others do not.

To that end, it is an objective of some embodiments to consider the interdependency of the motions of the EV 101 and the OAs 105*a* and 105*b* on each other. Some embodiments are based on the realization that, to achieve such an objective, the trajectory 107*a* of the EV 101 and the trajectories 107*b* and 107*c* of the OAs 105*a* and 105*b* can be determined jointly and interdependently by taking into account reaction of the OAs 105*a* and 105*b* to the motion of the EV 101. Since the trajectories are determined jointly and interdependently by taking into account the reaction of the OAs 105*a* and 105*b* to the motion of the EV 101, it leads to more realistic prediction of the future behavior of the OAs 105*a* and 105*b* and hence a more accurate determination of the trajectory 107*a* of the EV 101.

Additionally or alternatively, it is an object of some embodiments to provide a single objective optimization problem that can be used for joint and interdependent optimization of the trajectories of the EV 101 and the OAs 105*a* and 105*b*. Some embodiments are based on the realization that such a single objective optimization problem can join the competing motion objectives of the EV 101 and the OAs 105*a* and 105*b*. The single objective optimization problem that can join the competing motion objectives of the EV 101 and the OAs 105*a* and 105*b* can be a deviation of the trajectories of the EV 101 and the OAs 105*a* and 150*b* determined jointly and interdependently from the trajectories of the EV 101 and the OAs 105*a* and 150*b* determined independently.

Based on the above realizations and principles, the present disclosure provides a controller for controlling the motion of the EV 101 in the presence of the OAs 105*a* and 105*b* in the environment 100.

Figure 1B:
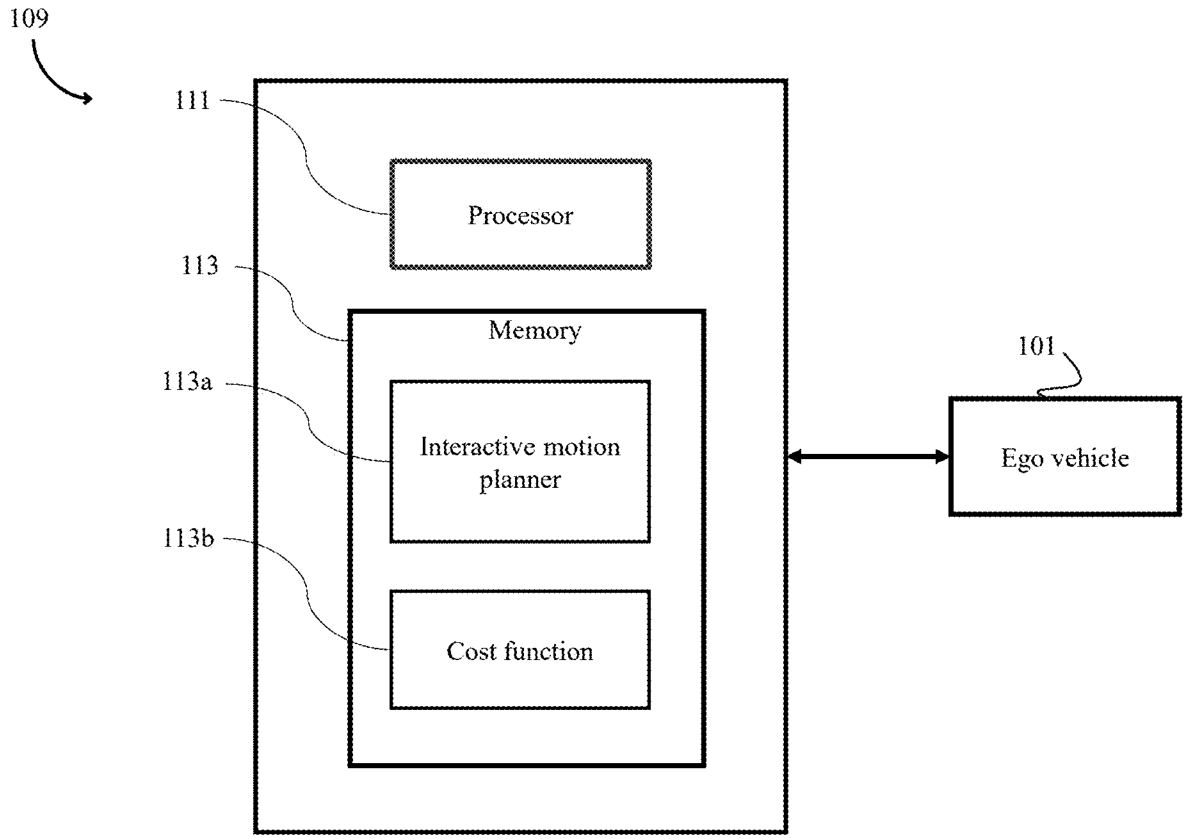
FIG. 1B shows a block diagram of a controller for controlling motion of the EV in presence of other agents (OAs) in the environment, according to an embodiment of the present disclosure.

FIG. 1B shows a block diagram of a controller 109 for controlling the motion of the EV 101 in the presence of the OAs 105*a* and 105*b* in the environment 100, according to an embodiment of the present disclosure. The controller 109 is communicatively coupled to the EV 101. The controller 109 includes a processor 111 and a memory 113. The processor 111 may be a single core processor, a multi-core processor, a computing cluster, or any number of other configurations. The memory 113 may include random access memory (RAM), read only memory (ROM), flash memory, or any other suitable memory systems. Additionally, in some embodiments, the memory 103 may be implemented using a hard drive, an optical drive, a thumb drive, an array of drives, or any combinations thereof.

Further, the memory 113 includes an interactive motion planner 113*a* and a cost function 113*b*. The processor 111 is configured to execute the interactive motion planner 113*a* and the cost function 113*b* to determine a trajectory for the EV 101, as explained below in FIG. 1C.

Figure 1C:
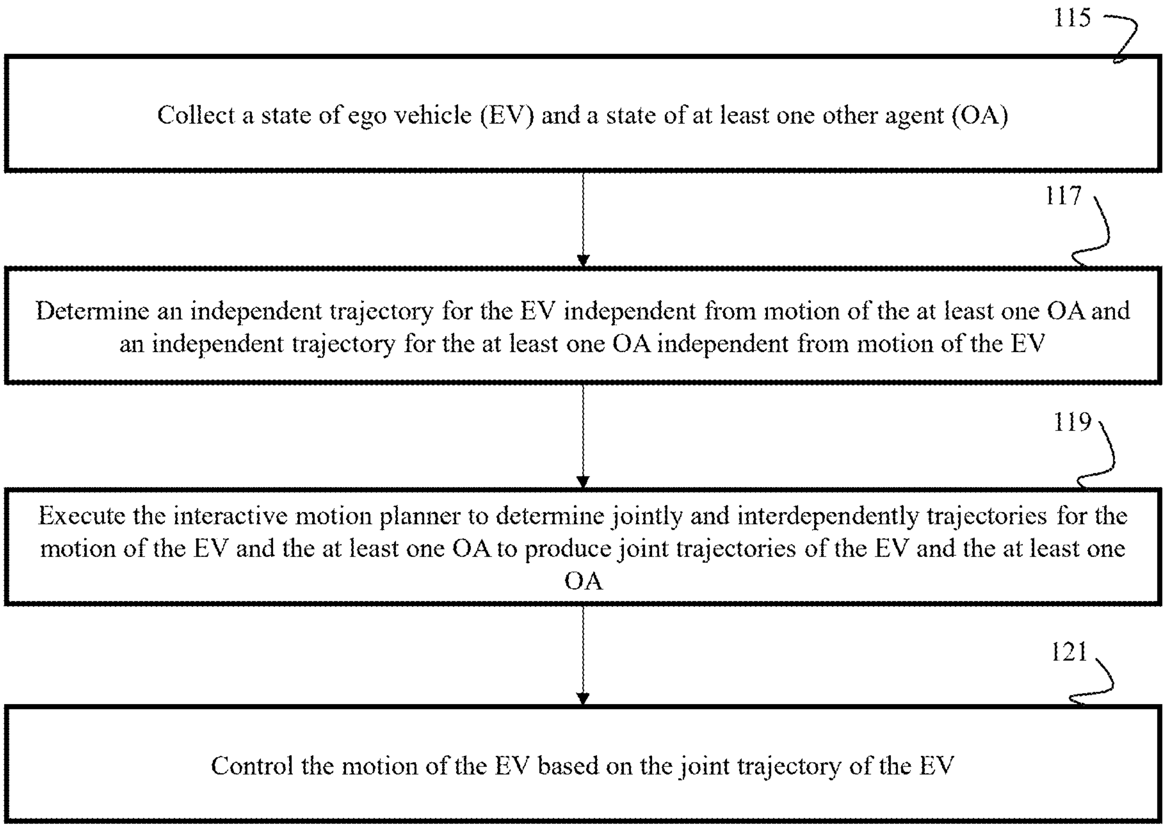
FIG. 1C illustrates a block diagram for determining a trajectory for the EV, according to some embodiments of the present disclosure.

FIG. 1C illustrates a block diagram for determining the trajectory for the EV 101, according to some embodiments of the present disclosure. At block 115, the processor 111 is configured to collect a state of the EV 101 and a state of at least one OA (e.g., the OA 105*a* or OA 105*b*). The state of the EV 101 includes a location of the EV 101, a velocity of the EV 101, an orientation of the EV 101, and the like. The state of the at least one OA includes a location of the at least one OA, a velocity of the at least one OA, an orientation of the at least one OA, and the like.

At block 117, the processor 111 is configured to determine an independent trajectory for the EV 101 independent from motion of the at least one OA and an independent trajectory for the at least one OA independent from motion of the EV 101. The processor 111 determines the independent trajectory for the EV 101 independent from the motion of the at least one OA, based on the state of the EV 101. The processor 111 determines the independent trajectory for the at least one OA independent from motion of the EV 101, based on the state of the at least one OA.

Figure 1D:
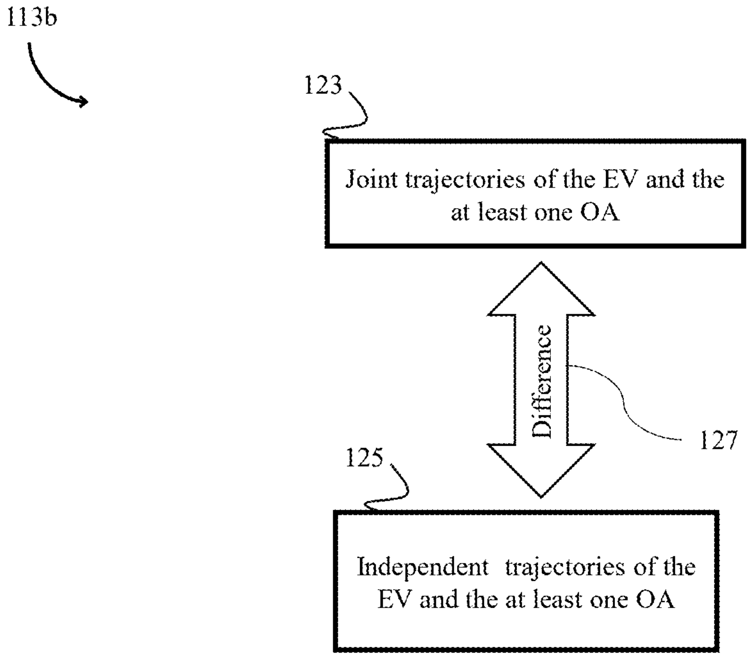
FIG. 1D illustrates a cost function, according to some embodiments of the present disclosure.

At block 119, the processor 111 is configured to execute the interactive motion planner 113*a*. The interactive motion planner 113*a* is configured to determine jointly and interdependently trajectories for the motion of the EV and the at least one OA to produce joint trajectories of the EV and the at least one OA by optimizing the cost function 113*b*. As shown in FIG. 1D, the cost function 113*b* is a difference 127 between joint trajectories 123 of the EV 101 and the at least one OA that are determined jointly and interdependently, and independent trajectories 125 of the EV 101 and the at least one OA determined at block 117. Optimizing the cost function 113*b* reduces the difference between the joint trajectories 123 and the independent trajectories 125 of the EV 101 and the at least one OA. The difference between the joint trajectories 123 and the independent trajectories 125 of the EV 101 and the at least one OA is explained in detail below in FIG. 1E.

At block 121, the processor 111 is configured to control the motion of the EV 101 based on the joint trajectory of the EV 101. For instance, the processor 111 determines control commands to one or more actuators of the EV 101, based on the joint trajectory of the EV 101. Further, the processor 111 controls the one or more actuators of the EV 101 based on the control commands to control the EV according the joint trajectory of the EV 101.

Figure 1E:
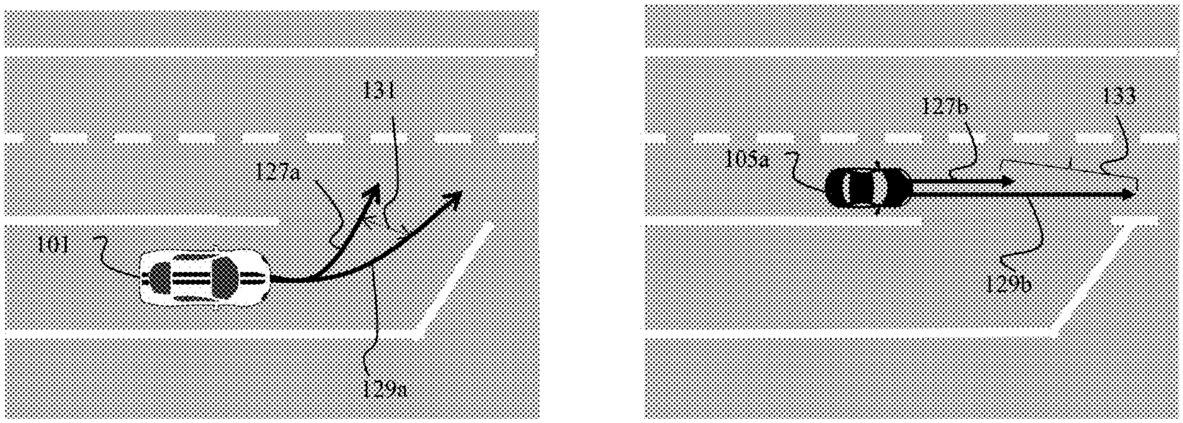
FIG. 1E illustrates the difference between joint trajectories and independent trajectories of the EV and at least one OA, according to some embodiments of the present disclosure.

FIG. 1E illustrates the difference between the joint trajectories and the independent trajectories of the EV 101 and the at least one OA, according to some embodiments of the present disclosure. An independent trajectory 127*a* corresponds to a trajectory of the EV 101 determined independent from the motion of the OA 105*a* based on the state of the EV 101, and an independent trajectory 127*b* corresponds to a trajectory of the OA 105*a* determined independent from the motion of the EV 101 based on the state of the OA 105*a*. A joint trajectory 129*a* of the EV 101 and a joint trajectory 129*b* of the OA 105*a* correspond to trajectories determined jointly and interdependently by optimizing the cost function 113*b*.

The optimization of the cost function 113*b* reduces a difference 131 between the joint trajectory 129*a* and the independent trajectory 127*a* of the EV 101 and a difference 133 between the joint trajectory 129*b* and the independent trajectory 127*b* of the OA 105*a*. In an embodiment, the difference 131 between the joint trajectory 129*a* and the independent trajectory 127*a* refers to a difference between control commands corresponding to the joint trajectory 129*a* and control commands corresponding to the joint trajectory 129*a*. Likewise, the difference 133 between the joint trajectory 129*b* and the independent trajectory 127*b* refers to a difference between control commands corresponding to the joint trajectory 129*b* and control commands corresponding to the independent trajectory 127*b*. As used herein, the control commands are control inputs applied to one or more actuators of a vehicle (e.g., EV 101) to drive the vehicle according to its trajectory.

Some embodiments are based on the realization that the difference 131 between the joint trajectory 129*a* and the independent trajectory 127*a* of the EV 101 and the difference 133 between the joint trajectory 129*b* and the independent trajectory 127*b* of the OA 105*a* can be assigned weights to give different preferences to the motion of the EV 101 and the OA 105*a*, respectively.

Figure 1F:
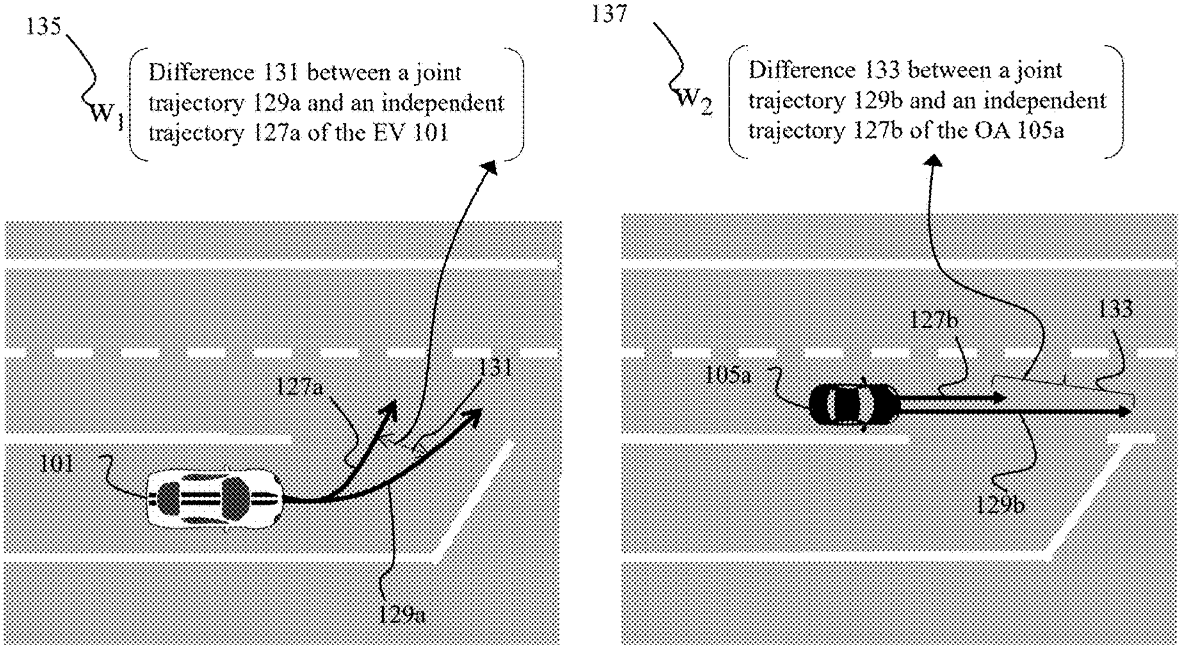
FIG. 1F illustrates different weights assigned to a difference between a joint trajectory and an independent trajectory of the EV and a difference between a joint trajectory and an independent trajectory of an OA, according to some embodiments of the present disclosure.

FIG. 1F illustrates different weights assigned to the difference 131 between the joint trajectory 129*a* and the independent trajectory 127*a* of the EV 101 and the difference 133 between the joint trajectory 129*b* and the independent trajectory 127*b* of the OA 105*a*, according to some embodiments of the present disclosure. A weight $w_1$ 135 is assigned to the difference 131 between the joint trajectory 129*a* and the independent trajectory 127*a* of the EV 101 and a weight $w_2$ 137 is assigned to the difference 133 between the joint trajectory 129*b* and the independent trajectory 127*b* of the OA 105*a*. To this end, the optimization of the cost function 113*b* is an optimization of a weighted difference between the joint trajectory 129*a* and the independent trajectory 127*a* of the EV 101 and the difference between the joint trajectory 129*b* and the independent trajectory 127*b* of the OA 105*a*.

In some embodiments, the weight $w_1$ 135 of the difference 131 between the joint trajectory 129*a* and the independent trajectory 127*a* of the EV 101 is fixed, and different weights are assigned the difference 133 between the joint trajectory 129*b* and the independent trajectory 127*b* of the OA 105*a* and a difference between a joint trajectory and an independent trajectory of the OA 105*b*. Assigning such different weights allows to give different preferences to the OAs 105*a* and 105*b* based on type of the OAs 105*a* and 105*b*.

Figure 1G:
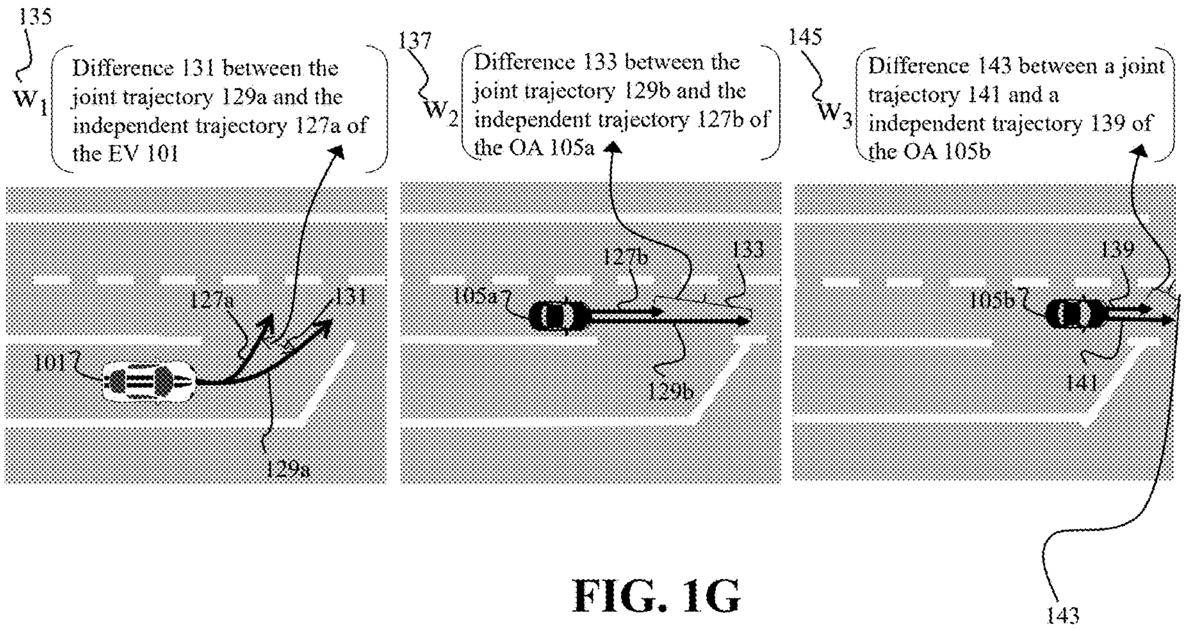
FIG. 1G illustrates different weights assigned to differences between joint trajectories and independent trajectories of the OAs, according to some embodiments of the present disclosure.

For instance, as shown in FIG. 1G, the weight $w_2$ 137 is assigned to the difference 133 between the joint trajectory 129*b* and the independent trajectory 127*b* of the OA 105*a* and a weight $w_3$ 145 is assigned to a difference 143 between a joint trajectory 141 and an independent trajectory 139 of the OA 105*b*. The independent trajectory 139 of the OA 105*b* corresponds to a trajectory of the OA 105*b* determined independent from the motion of the EV 101 based on the state of the OA 105*b*. In some embodiments, the weight $w_2$ 137 and the weight $w_3$ 145 are same. Such same weights allow to give equal preference to both the OAs 105*a* and 105*b*.

Some embodiments are based on the recognition that the cost function 113*b* produces a higher cost of deviation if one or both of the EV 101 and the OA deviate from the independent trajectories. However, a cost of deviation of the EV 101 can be different than a cost of deviation of the OAs to give preferences to rules and ethics of motion in the environment 100, such as rules and customs of merging into the dense traffic.

Additionally, or alternatively, some embodiments are based on the recognition that the cost of deviation can vary for different OAs.

Figure 2:
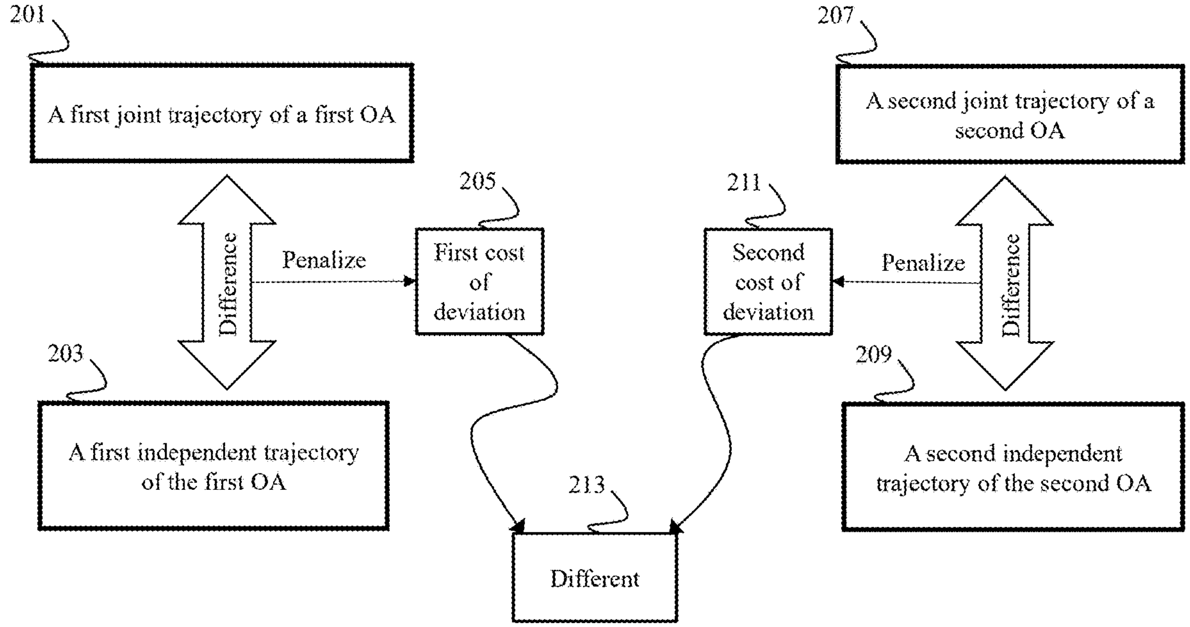
FIG. 2 illustrates different cost of deviations for different OAs, according to an embodiment of the represent disclosure.

FIG. 2 illustrates different cost of deviations for different OAs, according to an embodiment of the represent disclosure. The cost function 113*b* penalizes a difference of a first joint trajectory 201 of a first OA (e.g., the OA 105*a*) from a first independent trajectory 203 of the first OA with a first cost of deviation 205. Further, the cost function 113*b* penalizes a difference of a second joint trajectory 207 of a second OA (e.g., 105*b*) from a second independent trajectory 209 of the second OA with a second cost of deviation 211. The first cost of deviation 205 is different from the second cost of deviation 211.

This allows to consider specifics of the environment 100 and types of the OAs 105*a* and 105*b*. For example, consider that the EV 101 travels in the environment 100 including the OAs 105*a* and 105*b*, while a speed of the OA 105*a* is greater than a speed of the OA 105*b*. In this example, the cost of deviation for the OA 105*a* can be higher than the cost of deviation for the OA 105*b*. Another example is when the OA 105*a* is a cargo truck while the other OA 105*b* is a sedan.

Some embodiments are based on the realization that the cost of deviation is a parameter describing an intention of the OA to complete its objectives. As an analogy, that parameter describes stubbornness and aggressiveness of a driver of the OA that would prevent another car from merging into the lane in front of him. Some embodiments are based on the recognition that such a parameter can personalize an interdependent motion model of different embodiments to behavior of the different OAs. The parameter, i.e., the cost of deviation, can be collected by the controller 109 in real time over wireless communication channels.

Figure 3:
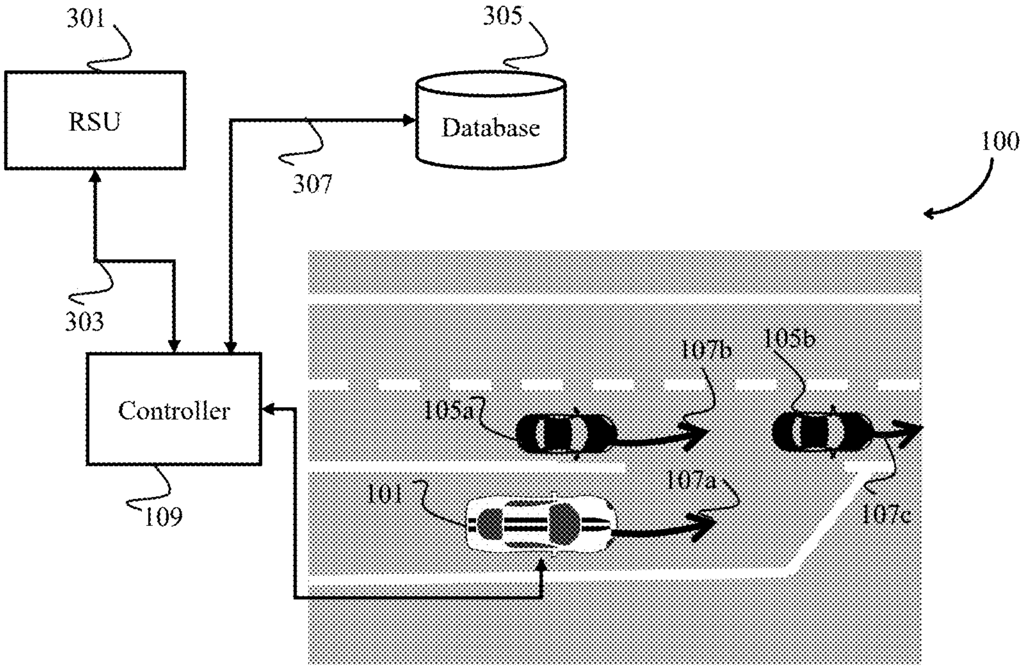
FIG. 3 illustrates collection of the different cost of deviations by the controller, according to an embedment of the present disclosure.

FIG. 3 illustrates collection of the first cost of deviation 205 and the second cost of deviation 211 by the controller 109, according to an embedment of the present disclosure. In an embodiment, the controller 109 is configured to collect the first cost of deviation 205 and/or the second cost of deviation 211 from a roadside unit (RSU) 301, over a wireless communication channel 303. The RSU 301 is installed alongside roads or highways in the environment 100 to facilitate serves as communication hub that facilitates exchange of information between vehicles and roadside infrastructure. The RSU 301 is equipped with wireless communication technologies, such as Dedicated Short-Range Communication (DSRC) or Cellular Vehicle-to-Everything (C-V2X), to establish connections with nearby vehicles equipped with compatible communication devices. The RSU 301 also communicates data including traffic management data, safety warnings, and other relevant information to the vehicles.

In another embodiment, the controller 109 is configured to collect the first cost of deviation 205 and/or the second cost of deviation 211 from a database 305, over a wireless communication channel 307. In some other embodiments, the controller 109 is configured to collect the first cost of deviation 205 and the second cost of deviation 211 from the OAs 105*a* and 105*b* themselves.

Some embodiments are based on the realization that the type of the OA and observed behavior of the OA can be used to determine the cost of deviation of the OA.

Figure 4:
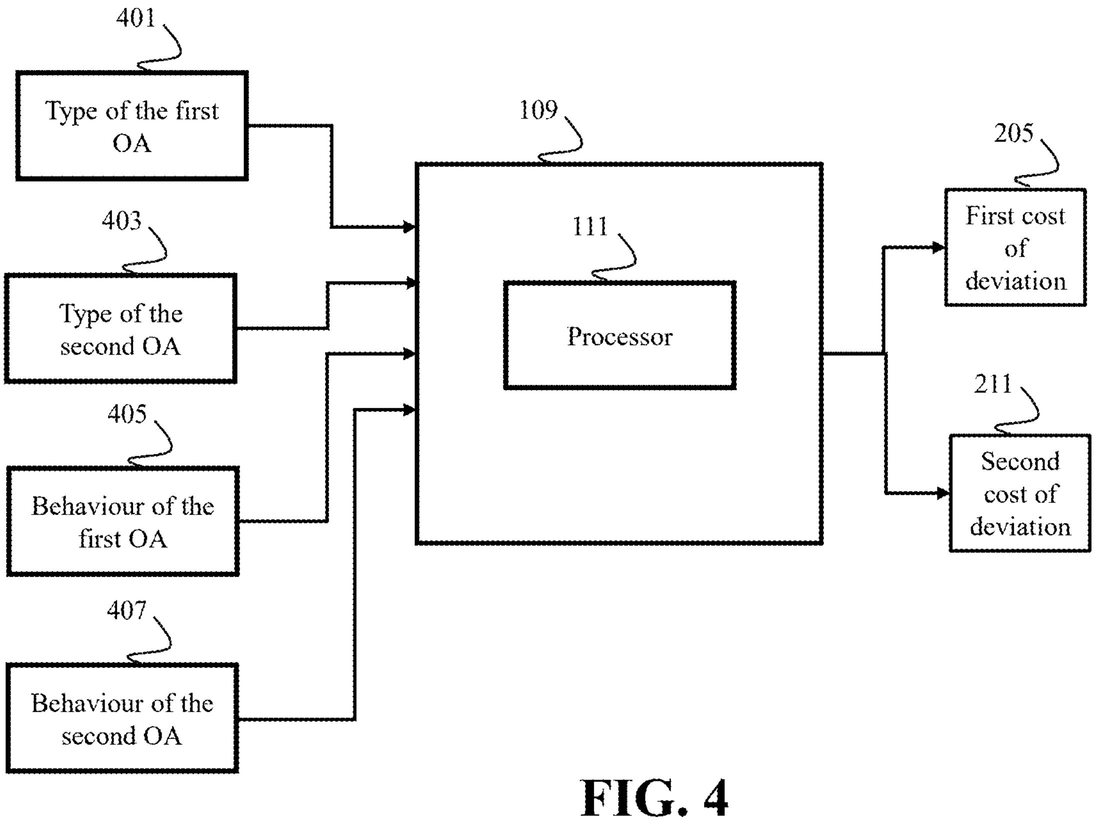
FIG. 4 shows a block diagram for determination of a first cost of deviation and a second cost of deviation, according to some embodiments of the present disclosure.

FIG. 4 shows a block diagram for determination of the first cost of deviation 205 and the second cost of deviation 211, according to some embodiments of the present disclosure. A type 401 of the first OA, a type 403 of the second OA, behavior 405 of the first OA, and behavior 407 of the second OA are input to the controller 109. The behavior 405 of the first OA includes one or more of a speed of the first OA, an orientation of the first OA, an acceleration of the first OA, a location of the first OA, and a driving pattern of the first OA. The behavior 407 of the second OA includes one or more of a speed of the second OA, an orientation of the second OA, an acceleration of the second OA, a location of the second OA, and a driving pattern of the second OA.

The processor 111 is configured to determine the first cost of deviation 205 based on the type 401 of the first OA and the behavior 405 of the first OA. The processor 111 is further configured to determine the second cost of deviation 211 based on the type 403 of the second OA and the behavior 407 of the second OA.

Figure 5A:
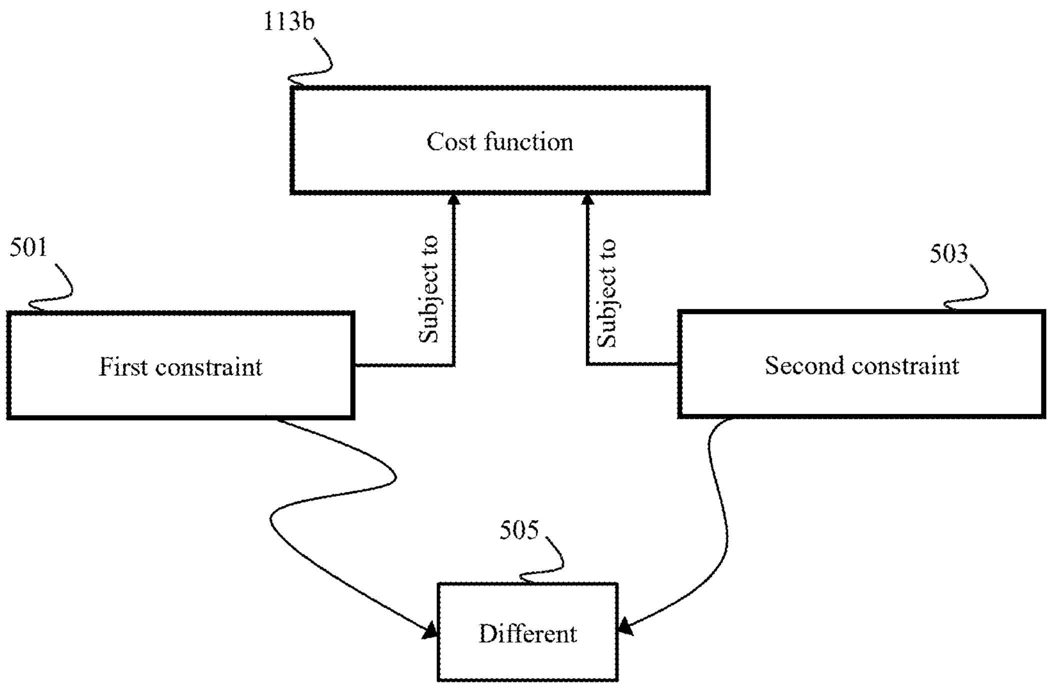
FIG. 5A illustrates different constraints enforced on the cost function, according to some embodiments of the present disclosure.

FIG. 5A illustrates different constraints enforced on the cost function 113*b*, according to some embodiments of the present disclosure. Some embodiments are based on the recognition that in addition to various constraints acting on the EV 101 and the OAs 105*a* and 105*b* due to the specifics of the environment and motion within the environment 100, the cost function 113*b* can be optimized subject to constraints on a mutual position between the EV 101 and the OAs 105*a* and 105*b*. Moreover, the constraints on the mutual position can be a function of a parameter indicative of safety perception by the OAs 105*a* and 105*b*. In such a manner, the OAs 105*a* and 105*b* can have different safety parameters further adapting the interdependency between the motions of the EV 101 and the OAs 105*a* and 105*b*.

To this end, the cost function 113*b* is optimized subject to a first constraint 501 on a mutual position between the EV 101 and the first OA (e.g., OA 105*a*) and a second constraint 503 on a mutual position between the EV 101 and the second OA (e.g., OA 105*b*). The first constraint 501 is different 505 from the second constraint 503.

Some embodiments are based on the understanding that while the optimization of the cost function 113*b* determines the joint trajectories for the OAs 105*a* and 105*b*, the joint trajectories are not used by the OAs 105*a* and 105*b* to control their motions. The OAs 105*a* and 105*b* may even be manually driven vehicles. However, the determined joint trajectories of the OAs 105*a* and 105*b* can be used to update a parameter indicative of the cost of deviation to reduce a difference between the determined joint trajectories and actual, i.e., observed trajectories of the OAs 105*a* and 105*b*. To this end, the processor 111 is configured to update the cost of deviation of the at least one OA based on a difference between the joint trajectory of the at least one OA and an observed trajectory of the at least one OA.

Figure 5B:
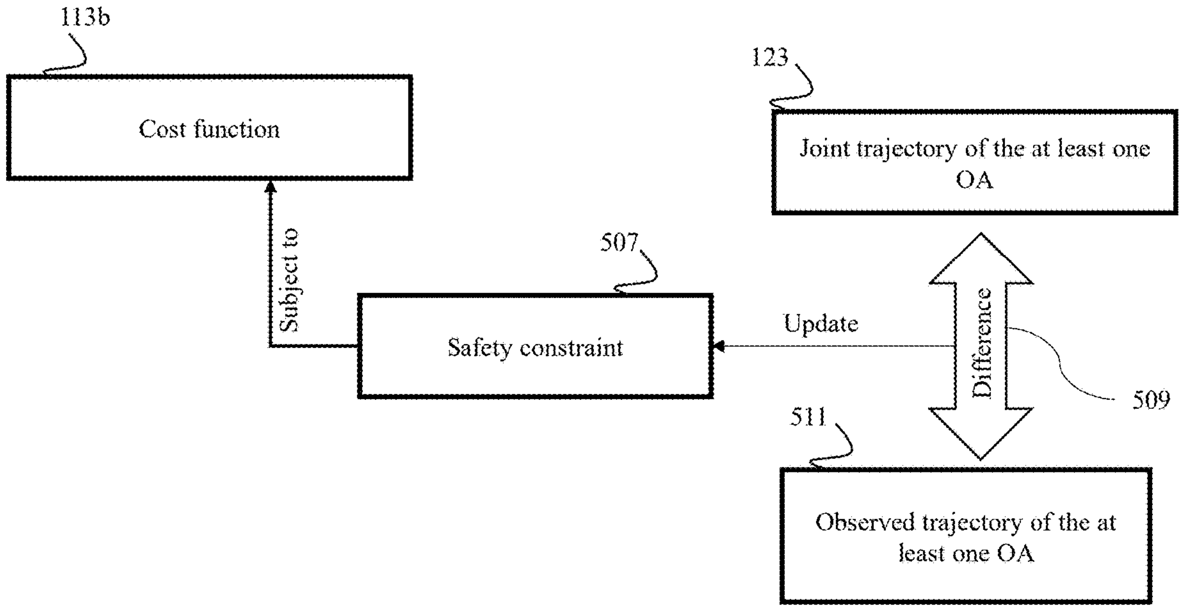
FIG. 5B illustrates a safety constraint enforced on the cost function, according to some embodiments of the present disclosure.

Additionally, as shown in FIG. 5B, in some embodiments, the cost function 113*b* is optimized subject to a safety constraint 507 on a mutual position between the EV 101 and the at least one OA. The processor 111 is configured to update the safety constraint 507 based on a difference 509 between the joint trajectory 123 of the at least one OA and an observed trajectory 511 of the at least one OA. Doing so in such a manner allows to consider the intention of the OAs to complete its objective and its notion of safety requirements and update such a balance dynamically to improve the accuracy of trajectory determination and control.

Figure 6:
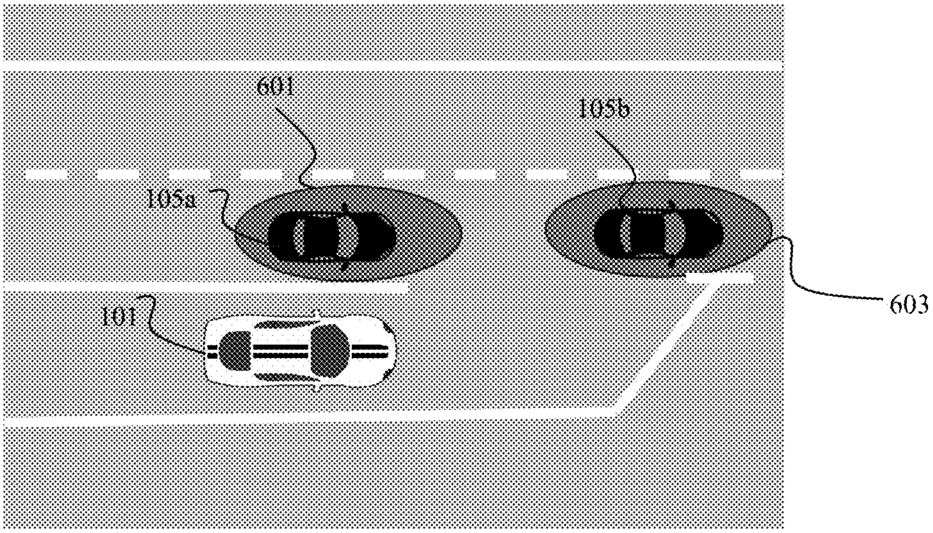
FIG. 6 illustrates a minimum safety distance that each OA prefers, according to some embodiments so of the present disclosure.

FIG. 6 illustrates a minimum safety distance that each OA prefers, according to some embodiments so of the present disclosure. Each of the OAs 105*a* and 105*b* has its safety preferences, represented by latent parameter Oi, influence their control actions and decision-making. The safety preferences such as minimum safety distances or preferred energy consumption affect the control actions of the OAs. Ellipsoid 601 around the OA 105*a* indicate the minimum safety distance that the OA 105*a* prefers. Ellipsoid 603 around the OA 105*b* indicate the minimum safety distance that the OA 105*b* prefers.

In some embodiments, the memory 113 of the controller 109 stores other modules, for example, an intention predictor module and other agent estimator module.

Figure 7:
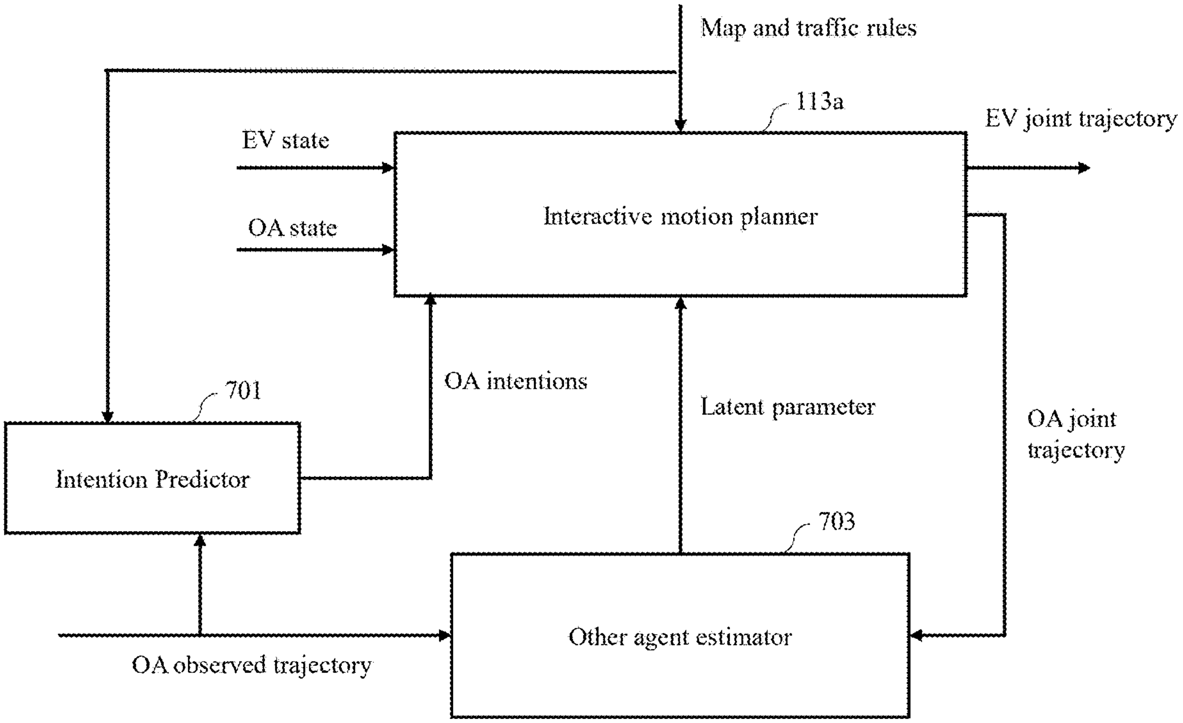
FIG. 7 illustrates different modules stored in a memory of the controller, according to some embodiments of the present disclosure.

FIG. 7 illustrates different modules stored in the memory 113 of the controller 109, according to some embodiments of the present disclosure. The memory 113 includes the interactive motion planner 113*a*, an intention predictor 701, and other agent estimator 703. These modules, i.e., the interactive motion planner 113*a*, the intention predictor 701, and the other agent estimator 703 are executed by the processor 111.

The state of the EV 101, the state of the OA (e.g., OA 105*a* and/or OA 105*b*), the intention of the OA, the latent parameter of the OA, map and traffic rules are input to the interactive motion planner 113*a*. The map and traffic rules include traffic speed limits, road boundaries, lane restrictions, and other traffic rules and conditions. The interactive motion planner 113*a* is configured to determine the joint trajectory of the EV 101 and the joint trajectory of the OA, based on the state of the EV 101, the state of the OA, the intention of the OA, the latent parameter of the OA, and the map and traffic rules.

The intention predictor 701 is configured to predict the intention of the OA based on the map and traffic rules and the observed trajectory of the OA. The other agent estimator 703 is configured to determine the latent parameter of the OA based on the observed trajectory of the OA and the joint trajectory of the OA.

Figure 8:
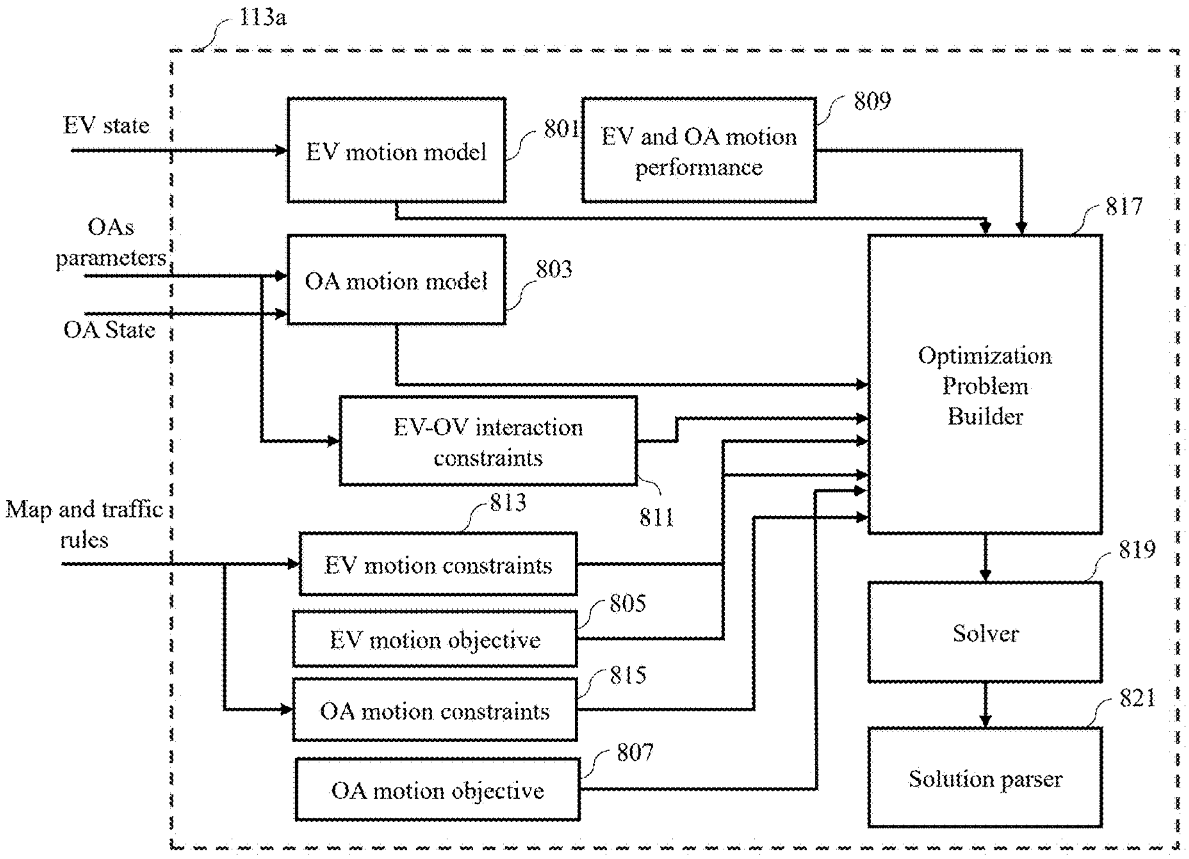
FIG. 8 illustrates different components of an interactive motion planner, according to some embodiments of the present disclosure.

FIG. 8 illustrates different components of the interactive motion planner 113*a*, according to some embodiments of the present disclosure. The interactive motion planner 113*a* includes an EV motion model 801, an OA motion model 803, a motion objective 805 of the EV 101, a motion objective 807 of the OA, EV and OA motion performance 809, EV-OV interaction constraints 811, motion constraints 813 of the EV 101, motion constraints 815 of the OA, an optimization problem builder 817, a solver 819, and a solution parsers 821.

The EV motion model 801 is initialized by the state of the EV 101 and the OA motion model 803 is initialized by the state of the OA. The optimization problem builder 817 is configured to build an optimization problem based on the EV motion model 801 initialized by the state of the EV 101, the OA motion model 803 is initialized by the state of the OA, the motion objective 805 of the EV 101, the motion objective 807 of the OA, the EV and OA motion performance 809, the EV-OV interaction constraints 811, the motion constraints 813 of the EV 101, and the motion constraints 815 of the OA. The solver 819 is configured to solve the optimization problem to produce a solution of the optimization problem. The solution parser 821 is configured to parse the solution into the control commands for the EV 101 and trajectories for the OAs 105*a* and 105*b*.

The EV motion model 801, the OA motion model 803, the motion objective 805 of the EV 101, the motion objective 807 of the OA, the EV and OA motion performance 809, and the EV-OV interaction constraints 811 are mathematically described below.

Throughout the present disclosure, $\mathbb{R}$, $\mathbb{R}_{0+}$, $\mathbb{R}_{+}$, $\mathbb{Z}$, $\mathbb{Z}_{0+}$, and $\mathbb{Z}$ denote sets of real, nonnegative real, positive real, integer, nonnegative integer, and positive integer numbers, respectively. Intervals are denoted by $\mathbb{Z}_{[a,b]}=\{z\in\mathbb{Z}: a\le z\le b\}$. Given a vector $x\in\mathbb{R}^{n_x}$, $x_i$ denotes ith element of x. tr(Σ) denotes a trace of matrix $\Sigma\in\mathbb{R}^{n_\Sigma\times n_\Sigma}$. $\|\cdot\|$ denotes a 2-norm operator. X=diag (x) denotes a diagonal matrix such that $X_{i|i}=x_i$. Given matrix $X\in\mathbb{R}^{n\times n}$, $X\ge 0$ denotes a positive semidefinite matrix.

For a non-linear control-affine system:

$$\dot{x}=f(x)+g(x)u, \tag{1}$$

$x\in\mathcal{X}\subset\mathbb{R}^{nx}$ and $u\in\mathcal{U}\subset\mathbb{R}^{nu}$ denotes state and control input vectors, respectively. Sets $\mathcal{X}$ and $\mathcal{U}$ denote respective state and control limits. The functions $f$: $\mathbb{R}^n\to\mathbb{R}^n$ and g: $\mathbb{R}^m\to\mathbb{R}^{n\times m}$ are locally Lipschitz continuous mappings.

A function α belongs to class-$\mathcal{K}$ if it is continuous, strictly increasing, and satisfies α(0)=0, defined on an interval [0, a) where a is a positive constant. α belongs to $\mathcal{K}_\infty$ if it satisfies an additional condition that its limit as r approaches infinity is infinity.

A set $C\subseteq\mathbb{R}^n$ is forward invariant if solutions of the system starting from any point $x(0)\in C$ always remain within C for all future time t. In other words, if $x(t)\in C$ holds for all $t\ge 0$ starting from any $x(0)\in C$.

A continuously differentiable function b: $\mathbb{R}^n\to\mathbb{R}$ is a candidate control barrier function (CBF) for a set $\mathcal{C}:=\{x\in\mathbb{R}^n: b(x)\ge 0\}$, if there exists a $\mathcal{K}_\infty$ function a(·) such that $\sup_{u\in U}[\mathcal{L}_f b(x)+\mathcal{L}_g b(x)\,u]$24 $-a(b(x))$ for all $x\in\mathcal{C}$, where U is a non-empty set of admissible control inputs, and $\mathcal{L}_f V$ and $\mathcal{L}_g V$ are Lie derivatives of b along vector fields f and g, respectively.

A Control Lyapunov function (CLF) is a smooth function V: $\mathbb{R}^n\to\mathbb{R}$ such that satisfies $c_1|x|2\le V(x)\le C_2|x|^2$ for all $x\in\mathbb{R}^n$, and $\inf_{u\in U}[\mathcal{L}_f V(x)+\mathcal{L}_g V(x)u+c_3V(x)]\le e$ for all $x\in\mathbb{R}^n$, where $c_1$, $c_2$, $c_3$ are positive constants and e is a relaxation variable. If the control input $u\in\mathbb{R}^m$ to the system satisfies the CLF, the system is globally asymptotically stable.

Ev Motion Model and Oa Motion Model

The motion of the EV and the OA is determined by a dynamical model (1). For instance, (1) is bicycle dynamics:

$$\underbrace{\begin{bmatrix}\dot{x}_i\\ \dot{y}_i\\ \dot{\psi}_i\\ \dot{v}_i\end{bmatrix}}_{\dot{x}_i}=\underbrace{\begin{bmatrix}v_i\cos(\psi_i)\\ v_i\sin(\psi_i)\\ 0\\ 0\end{bmatrix}}_{f(x_i(t))}+\underbrace{\begin{bmatrix}0&0\\ 0&0\\ 0&v_i/L_w\\ 1&0\end{bmatrix}\begin{bmatrix}u_i\\ \phi_i\end{bmatrix}}_{g(x_i(t),u_i(t))} \tag{2}$$

where, $x_i$, $y_i$, $\psi_i$, and $v_i$ are current longitudinal position, lateral position, heading angle, and speed of vehicle i, respectively, $u_i$ and $\phi_i$ denote vehicle i's acceleration and steering angle (control inputs) at time t, Lw denotes a wheelbase length.

The dynamic model (1) of the OA and the EV is subject to state and input constraints that include the traffic speed limits, the road boundaries, the lane restrictions, and physical limitations $$x_i\in\mathcal{X}_i,\ u_i\in\mathcal{U}_i, \tag{3}$$

$\mathcal{X}_i$ and $\mathcal{U}_i$ represent the set of state and input, respectively, where constraints are satisfied. The constraints can vary based on a specific scenario. For instance, given a road width l, and setting a center of a lane y=0, for a 2 lane road the lateral position of the EV is constrained as $$-\frac{l}{2}\le y_t^i\le\frac{3}{2}l.$$

Constraints on the control input ranges are $$u_{min}^i\le u_t^i\le u_{max}^i,$$

and constraints on velocity are $$v_{min}^i\le v_t^i\le v_{max}^i.$$

The interactive motion planner 113*a* combines the EV motion model 801 and the OA motion model 803 and discretize them in time with sampling period $T_s$ obtaining $$\underbrace{\begin{bmatrix}x_{t+1}^e\\ x_{t+1}^1\\ \vdots\\ x_{t+1}^N\end{bmatrix}}_{X_{t+1}}=\underbrace{\begin{bmatrix}f(x_t^e)+g(u_t^e)\\ f(x_t^1)+g(u_t^1)\\ \vdots\\ f(x_t^N)+g(u_t^N)\end{bmatrix}}_{F(X_t,U_t)}, \tag{4}$$

where $X_t\in\mathbb{R}^{n_x\times(N+1)}$ and $U_t\in\mathbb{R}^{n_u\times(N+1)}$ denote concatenation of the states and the control inputs of all vehicles (i.e., EV 101 and the OAs 105*a* and 105*b*).

The Motion Objective of the EV 101 and the Motion Objective of the OA

The EV 101 produces a motion that eventually achieves an objective of the EV motion $$x_{goal}^{e}.$$

For instance, in a merging scenario the motion objective of the EV 101 is reaching a merging point, or for a lane change maneuver, the motion objective is reaching a specified lane. According to some embodiments, the motion objective of the EV can be achieved if the controller 109 includes a constraint that reduces a distance between a current EV state $$x_t^e$$

and the EV motion $$x_{goal}^{e}.$$

In some embodiments, such a constraint is obtained as a control Lyapunov function constraint $$\mathcal{V}_e(x_t^e, x_{goal}^e) = \|x_t^e - x_{goal}^e\|^2 \tag{5}$$

$$\mathcal{L}_{g_e}\mathcal{V}_e(x_t^e, x_{goal}^e)u + \mathcal{L}_{f_e}\mathcal{V}_e(x_t^e, x_{goal}^e) + p_2\mathcal{V}_e(x_t^i, x_{goal}^e) \le \varepsilon_e,$$

where $$\mathcal{L}_{f_e}\mathcal{V}_e(x_t^i) \text{ and } \mathcal{L}_{g_e}\mathcal{V}_e(x_t^i)$$

denote the lie derivatives of $$\mathcal{V}_e(x_t^i)$$

along affine dynamics of the EV 101, $\varepsilon_e$ is a slack variable that ensures that progress towards $$x_{goal}^e$$

is enforced only if it is possible to do so without compromising safety conditions and $p_2$ is a non-negative parameter selected based on a desired rate of approaching $$x_{goal}^{e}.$$

Similarly, for each vehicle i∈$\mathcal{H}$, a constraint that imposes to progress towards a predicted intention $$\hat{x}_t^i$$

is defined. The constraint can be implemented as the control Lyapunov function $$\mathcal{V}_i(x_t^i, \hat{x}_t^i) = \|x_t^i - \hat{x}_t^i\|^2 \ \forall\ i \in \mathcal{H} \tag{6}$$

$$\mathcal{L}_{g_i}\mathcal{V}_i(x_t^i, \hat{x}_t^i)u + \mathcal{L}_{f_i}\mathcal{V}_e(x_t^i, \hat{x}_t^i) + \theta_g^i\mathcal{V}_i(x_t^i, \hat{x}_t^i) \le \varepsilon_i,$$

where, $$\theta_g^i$$

is a parameter to be learned and which ensures that $V_i$ decreases over time, driving the state $$x_t^i$$

towards the predicted intention $$\hat{x}_t^i,$$

and slack variable $$\varepsilon_t^i$$

ensures that progress towards the objective is enforced only if it is possible to do so without compromising safety conditions The intention predictor 701 uses scenario $\mathcal{S}(t_0)$, a current state of the traffic $X(t_0)$ at current time to $t_0$ produce a set of non-reactive intentions $$\{\hat{x}_t^i, \hat{u}_t^i\}$$

$\nabla t\in(t_0, T]$ for each vehicle i∈$\mathcal{H}$. For instance, the non-reactive intentions are defined as a target control input such as acceleration and steering, or as a goal, such as a target position or velocity, or both.

In an embodiment, the intention predictor 701 is obtained by a trajectory prediction function $\mathcal{F}(X(t_0), \mathcal{S}(t_0))$: $\mathbb{R}^{4\times N}\rightarrow\mathbb{R}^{2\lambda N\times T}$. Using the intention predictor 701, the controller 109 can predict an intended path $$\hat{\xi}_i = \{\hat{x}_t^i, \hat{u}_t^i\}$$

for each vehicle i if vehicles are not present. However, such prediction needs adjustment when the EV 10 and the OAs are present, which is done by solving the optimization problem.

EV and OA Motion Performance and Cost Function

Figure 9A:
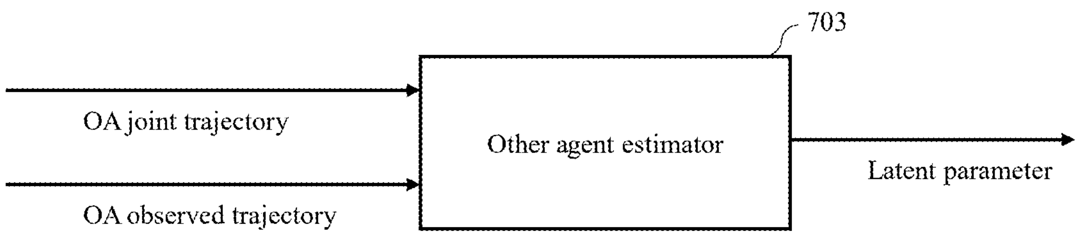
FIG. 9A illustrates computation of a latent parameter of the OA, according to some embodiments of the present disclosure.

In an embodiment, the controller 109 uses a cost function that includes performance objective of the motion of the EV 101 and the OAs 105*a* and 105*b*. Specifically, the cost function includes the motion objective of the EV 101 and a weighted motion objective of the at least one OA (e.g., the OA 105*a* and/or OA 105*b*). A weight of the weighted motion objective of the at least one OA depends on a weight matrix that is based on the latent parameter of the at least one OA. The latent parameter of the at least one OA is computed by the other agent estimator 703. As shown in FIG. 9A, the observed trajectory of the at least one OA and the joint trajectory of the at least one OA are input to the other agent estimator 703. The other agent estimator 703 is configured to determine the latent parameter of the at least one OA based on the observed trajectory of the at least one OA and the joint trajectory of the at least one OA.

In some embodiments, the cost function is formulated as a quadratic cost $$\mathcal{J}(U_k;\Theta_c) = \underbrace{\|u_t^e\|_{Q_e}}_{\mathcal{J}_e(u_t^e)} + \sum_{i=1}^{N} \underbrace{\left(\left\|u_t^i - \hat{u}_t^i\right\|_{Q_i^{\theta_{dev}}} + \left\|u_t^i\right\|_{R_i^{\theta_u}}\right)}_{\mathcal{J}_i(u_t^i,\hat{u}_t^i;\Theta_c^i)} \tag{7}$$

where a weight matrix $Q_e \geq 0$ is fixed, while $$Q_i^{\theta_{dev}} \geq 0 \text{ and } R_i^{\theta_u} \geq 0,$$

are dependent on the latent parameters that are computed by the other agent estimator 703. $\mathcal{J}_e(\cdot)$ is the cost for the EV 101 and $\mathcal{J}_i(\cdot)$ is the cost for the OA i.

EV-OA Interaction Constraints and Safety Constraints

Let $$S_S^i := \{x_i \mid g_S(x_i) \geq 0\}$$

denote a safety set for vehicle i and $$S_S^j := \{x_j \mid g_S(x_j) \geq 0\}$$

denote the safety set for vehicle j. A combined safety for the system is $$S^S := S_S^i \cap S_S^j = \{x \mid b_S(x_i, x_j) \geq 0\},$$

where $b_s(x_i, x_j)$ is a function that characterizes an intersection of these two sets.

The safety constraint is obtained by a control barrier function constraint that includes values of states and values of first-order derivatives of the state of the EV 101 and the state of the at least one OA. In particular, the controller 109 ensures safety between the EV 101 and the OA as an invariant safety set using an ellipsoidal control barrier function (CBF) constraint $b_{ij}(x_i, x_j)$. A possible formulation of the CBF constraint is $$b_{ij}(x_i, x_j) := \frac{(x_t^i - x_t^j)^2}{a^2} + \frac{(y_t^i - y_t^j)^2}{b^2} - 1 \geq 0, \tag{8}$$

where a and b denote major and minor semi axes of the ellipsoid, respectively. However, the control inputs $u_i$ and $u_j$ do not appear in the Lie derivatives, which makes it insensitive to the control action. Thus, the ellipsoidal CBF includes the first-order derivatives of the states:

$$\Psi_{ij}^{(1)}(x_i, x_j) = \frac{2}{a^2}(x_t^i - x_t^j)^2(v_t^i \cos\psi_t^i - v_t^j \cos\psi_t^j) + \frac{2}{b^2}(y_t^i - y_t^j)^2(v_t^i \sin\psi_t^i - v_t^j \sin\psi_t^j) + p_1(\Psi_{ij}^{(0)}) \tag{9}$$

where $p_1 > 0$ is a linear class-$\mathcal{K}$ function gain and $$\Psi_{ij}^{(0)} := b_{ij}(x_i, x_j)$$

is the ellipsoidal safety function (8). Thus, the controller 109 enforces the CBF constraint:

$$\underbrace{\mathcal{L}_{f_i}\Psi_{ij}^{(1)}(x_i, x_j) + \mathcal{L}_{g_i}\Psi_{ij}^{(1)}(x_i, x_j)u_i}_{\text{Vehicle } i\text{'s Influence}} + \underbrace{\mathcal{L}_{f_j}\Psi_{ij}^{(1)}(x_i, x_j) + \mathcal{L}_{g_j}\Psi_{ij}^{(1)}(x_i, x_j)u_j}_{\text{Vehicle } j\text{'s Influence}} \geq \underbrace{-\alpha(\Psi_{ij}^{(1)}(x_i, x_j))}_{\text{Safety Margin}} \tag{10}$$

where $$\alpha(\Psi_{ij}^{(1)}(x_i, x_j))$$

is a class-$\mathcal{K}$ function gain and represents the safety preferences of the vehicle pair (i, j) which is learned by the other agent estimator 703.

In some embodiments, the class-$\mathcal{K}$ function is parametrized as $$\alpha(\Psi_{ij}^{(1)}(x_i, x_j)) = \alpha_{ij}(x_i, x_j; \Theta_s^{ij}) = \sum_{k=0}^{d} \theta_{2k+1}\Psi_{ij}^{(1)}(x_i, x_j)^{2k+1} \tag{11}$$

where d is the highest degree of odd polynomial, and $\Theta_{2k+1}$ are the parameters to be learned. Thus, the following safety constraint is derived $$G_s^{ij}(x_i, x_j; \Theta_s^{ij}) := \underbrace{\mathcal{L}_{f_i}\Psi_{ij}^{(1)}(x_i, x_j) + \mathcal{L}_{g_i}\Psi_{ij}^{(1)}(x_i, x_j)u_i}_{\text{Vehicle } i\text{'s Influence}} + \underbrace{\mathcal{L}_{f_j}\Psi_{ij}^{(1)}(x_i, x_j) + \mathcal{L}_{g_j}\Psi_{ij}^{(1)}}_{\text{Vehicle } j\text{'s Influence}}(x_i, x_j)u_j \geq \underbrace{-\alpha_{ij}(x_i, x_j; \Theta_s^{ij})}_{\text{Safety Margin}} \tag{12}$$

with $$\Theta_s^{ij}$$

$\in \mathbb{R}^m$ is a vector containing parameters that describe a safety margin.

Other Agent Estimator

The other agent estimator 703 is configured to compute the latent parameter $\Theta_i$ to determine the OA trajectory $\xi_i(\Theta_i)$ and compares such trajectory with the observed trajectories $\mathcal{D}$ of the OA to determine the best value for $\Theta_i$ by computing an optimization $$\underset{\Theta}{\operatorname{argmax}} \mathcal{L}(\Theta; \mathcal{D}), \tag{13}$$

where $\mathcal{L}$ ($\Theta$; $\mathcal{D}$) denotes a likelihood of the latent parameter O given the observed trajectories in dataset $\mathcal{D}$.

The other agent estimator 703 evaluates a mapping function $f_\Theta(\Theta_t)$ that maps the latent parameter $\Theta_t$ to the parameters in the OA motion objective, the OA motion performance, and the EV-OA interaction constraints, and computes the OA trajectory $$\hat{\xi}_{t-T|t} = h(f_\Theta(\Theta_t), x_{t-T|t}) \tag{14}$$

Such computation is obtained from the solution of the optimization problem in the interactive motion planner 113*a*. The other agent estimator 703 compares the computed OA trajectory to the trajectory $\xi_t$, executed by the OA as $$\Theta_{t+1} = \Theta_t + \Delta\Theta_t$$
$$\xi_t = h(f_\Theta(\Theta_t)) + \Delta v_t$$

and update the parameters as $\Delta\Theta_t = K_t(\xi_t - h(f_\Theta(\Theta_t))$ where a gain $K_t$ is computed as:

$$K_t = P_{t|t-1} H_t^T S_t^{-1} \tag{15}$$
$$S_t = H_t P_{t|t-1} H_t^T + C_v$$
$$P_{t|t-1} = P_{t-1|t-1} + C_\Theta$$
$$P_{t|t} = (I - K_t H_t) P_{t|t-1}$$

and $\Theta_t$ is modelled $\Theta_t \sim \mathcal{N}(0, C_\Theta)$ and $\Delta v_t \sim \mathcal{N}(0, C_v)$ and $H_t$ is a Jacobian of $h(\Theta_t)$ computed as $$H_t = \frac{\delta h(\Theta_t)}{\delta\Theta_t} = \frac{\delta h(\Theta_t)}{\delta\xi_t}\frac{\delta\xi_t}{\delta\Theta_t}.$$

In some embodiments, the mapping function is a Direct Mapping $$f_\Theta(\Theta_t) = \Theta_t \tag{16}$$

In this case, the latent parameters $\Theta_t$ directly represent the performance and safety preferences of the OAs.

Figure 9B:
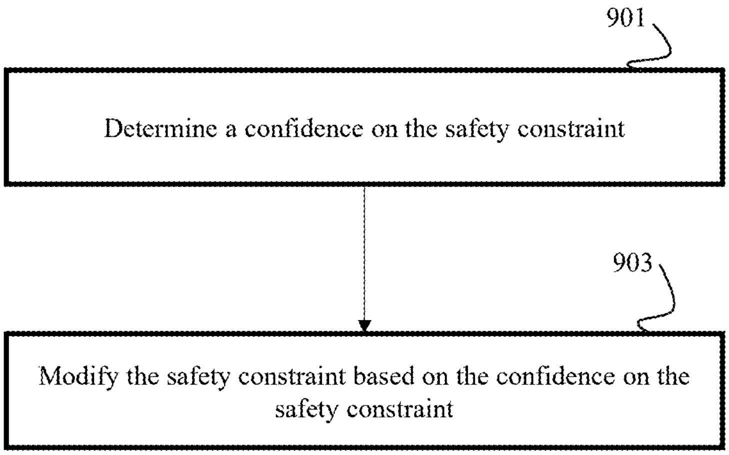
FIG. 9B illustrates modification of the safety constraint, according to some embodiments of the present disclosure.

In some other embodiments, the mapping function is a Multilayer Perceptron (MLP) neural network $$f_\Theta(X_t; \Theta) = W_L(\ \dots\ \varphi(W_1 X_t + b_1)) + b_L, \tag{17}$$

where L−1 is a number of hidden layers, where $W_\ell$ and $b_\ell$ are weights and biases for layer $\ell$, and $\Theta = [W_1, b_1, \dots, W_L, b_L]$ FIG. 9B illustrates modification of the safety constraint, according to some embodiments of the present disclosure. At block 901, the processor 111 is configured to determine a confidence on the safety constraint. In an embodiment, the confidence on the safety constraint depends on uncertainty in the computation of the latent parameters.

At block 903, the processor 111 is configured to modify the safety constraint based on the confidence on the safety constraint. The safety constraint is modified based on the confidence on the safety constraint, such that when the cost function is subject to the modified safety constraint, a percentage fraction of realizations of the joint trajectories that satisfy the safety constraint with uncertainty in the safety constraint is larger than a pre-assigned percentage fraction.

Some embodiments modify and robustify the safety constraint to account for the uncertainty in the computation of the latent parameters based on parameter vector $$\Theta_s^{ej}$$

and enforce a chance constraint $$Pr\left(G_s^{ei}(x_t^e, x_t^i; \Theta_s^{ei}) \le 0\right) \le 1 - \epsilon\ \forall\, i \in \mathcal{H} \tag{18}$$

Using information on the uncertainty of parameter estimate $$C_{\Theta_s^{ei}} = \operatorname{diag}([\omega_1, \dots, \omega_m])$$

from (15), the controller 109 modifies the safety constraint (12) into $$\forall\, i \in \mathcal{H}$$
$$G_r(x_t^e, x_t^i; \Theta_s^{ei}) :=$$
$$\mathcal{L}_{f_i}\Psi_{ei}(x_e, x_i) + \mathcal{L}_{g_i}\Psi_{ei}(x_e, x_i)u_i + \mathcal{L}_{f_j}\Psi_{ei}(x_e, x_i) + \mathcal{L}_{g_j}\Psi_{ei}(x_e, x_i)u_j \ge$$
$$-\alpha_{ei}(x_e, x_i; \Theta_s^{ei}) - \Phi^{-1}(p)\sqrt{tr\left(\textstyle\sum_\Omega\right)}$$

where, $@^1(p)\sqrt{tr(\Sigma_\Omega)}$ and $p = 1-\epsilon$ adjust the safety margin accounting for the uncertainty in the learned parameters and is obtained from the uncertainty in the parameter estimate $$C_{\Theta_s^{ei}}.$$

According to an embodiment, the optimization problem built by the optimization problem builder 817 is given by $$\min_{U_t, \mathcal{E}_t} \underbrace{\|u_t^e\|_{Q_e}}_{\mathcal{J}_e(u_t^e)} + \sum_{i=1}^{N} \underbrace{\mathbb{E}\left(\|u_t^i - \hat{u}_t^i\|_{Q_i^{\theta_{dev}}} + \|u_t^i\|_{R_1^{\theta_u}}\right)}_{\mathcal{J}_i(u_t^i, \hat{u}_t^i, \Theta_c^i)} + \mathcal{E}_t P$$

s.t. (3), (4), (5), (6), (12) $\forall\, i \in \mathcal{H}$ where expectation is taken over the uncertainty in parameter vector Θc, $\varepsilon_t$ is a vector including all the slack variables in the CLF and P denotes a linear penalization vector that penalizes the slack variables.

Figure 10A:
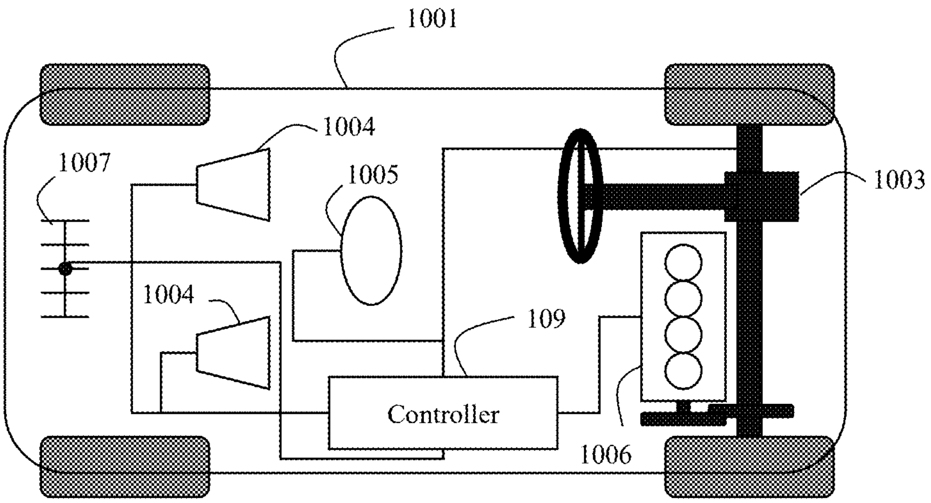
FIG. 10A shows a schematic of a vehicle including the controller for controlling the vehicle, according to some embodiments of the present disclosure.

FIG. 10A shows a schematic of a vehicle 1001 including the controller 109, according to some embodiments of the present disclosure. The vehicle 1001 corresponds to the EV 101. As used herein, the vehicle 1001 can be any type of wheeled vehicle, such as a passenger car, bus, or rover. Also, the vehicle 1001 can be an autonomous or semi-autonomous vehicle. For example, some embodiments control the motion of the vehicle 1001. Examples of the motion include lateral motion of the vehicle 1001 controlled by a steering system 1003 of the vehicle 1001. In one embodiment, the steering system 1003 is controlled by the controller 109. Additionally or alternatively, the steering system 1003 can be controlled by a driver of the vehicle 1001.

The vehicle 1001 can also include an engine 1006, which can be controlled by the controller 109 or by other components of the vehicle 1001. The vehicle can also include one or more sensors 1004 to sense the surrounding environment. Examples of the sensors 1004 include distance range finders, radars, lidars, and cameras. The vehicle 1001 can also include one or more sensors 1005 to sense its current motion quantities and internal status. Examples of the sensors 1005 include global positioning system (GPS), accelerometers, inertial measurement units, gyroscopes, shaft rotational sensors, torque sensors, deflection sensors, pressure sensor, and flow sensors. The sensors provide information to the controller 109. The vehicle can be equipped with a transceiver 1007 enabling communication capabilities of the controller 109 through wired or wireless communication channels.

Figure 10B:
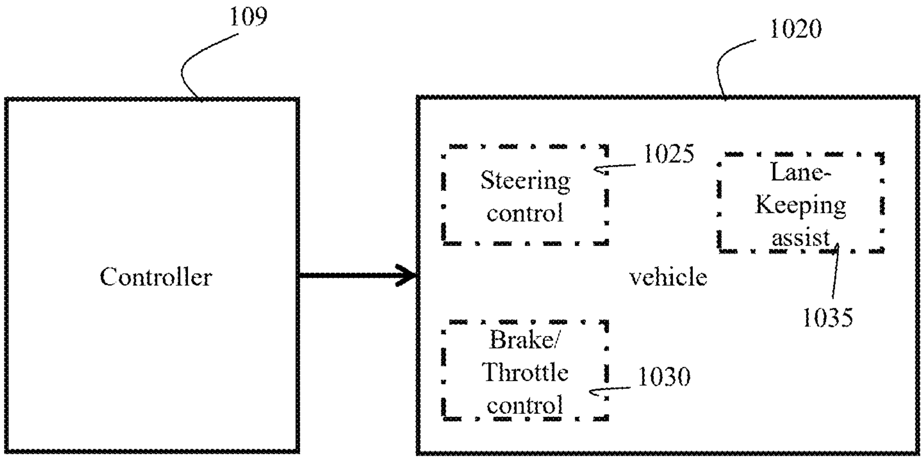
FIG. 10B shows a schematic of interaction between the controller and controllers of the vehicle, according to some embodiments of the present disclosure.

FIG. 10B shows a schematic of interaction between the controller 109 and controllers 1020 of the vehicle 1001, according to some embodiments. For example, in some embodiments, the controllers 1020 of the vehicle 1001 are steering controller 1025 and brake/throttle controllers 1030 that control rotation and acceleration of the vehicle 1001. In such a case, the controller 109 outputs control commands to the controllers 1025 and 1030 to control a state of the vehicle 1001 such as acceleration, orientation, and the like, for controlling motion of the vehicle 1001. The controllers 1020 can also include high-level controllers, e.g., a lane-keeping assist controller 1035 that further process the control commands of the controller 109. In both cases, the controllers 1020 maps use the control commands of the controller 109 to control at least one actuator of the vehicle 1001, such as the steering wheel and/or the brakes of the vehicle 1001, in order to control the motion of the vehicle 1001.

Figure 10C:
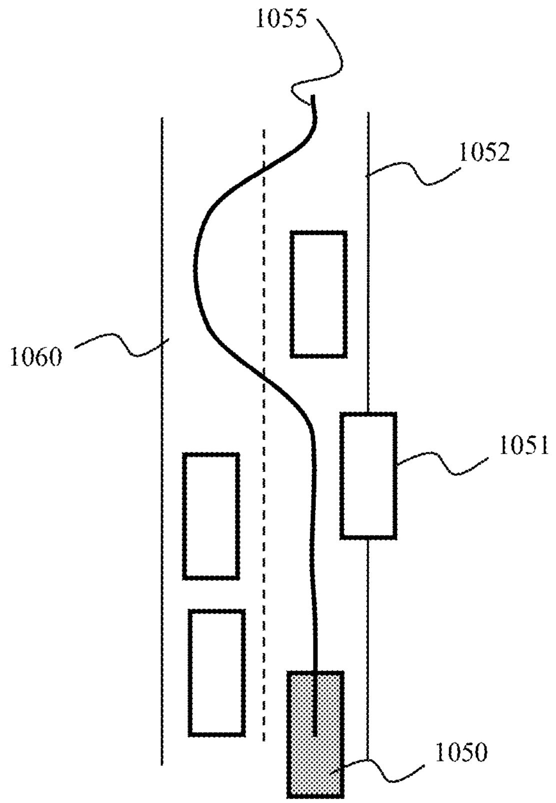
FIG. 10C shows a schematic of a trajectory for the vehicle, according to some embodiments of the present disclosure.

FIG. 10C shows a schematic of an autonomous or semi-autonomous vehicle 1050 controlled by the controller 109, for which the joint trajectory is computed by using principles of some embodiments described in FIGS. 1A-1D. The joint trajectory 1055 aims to keep the vehicle 1050 within particular road bounds 1052, and aims to merge into a lane 1060 while avoiding other uncontrolled vehicles, i.e., OAs 1051. The controlled vehicle 1050 can make decisions in real time such as, e.g., pass another vehicle on the left or on the right side or instead to stay behind another vehicle within the current lane of the road 1052.

Figure 11A:
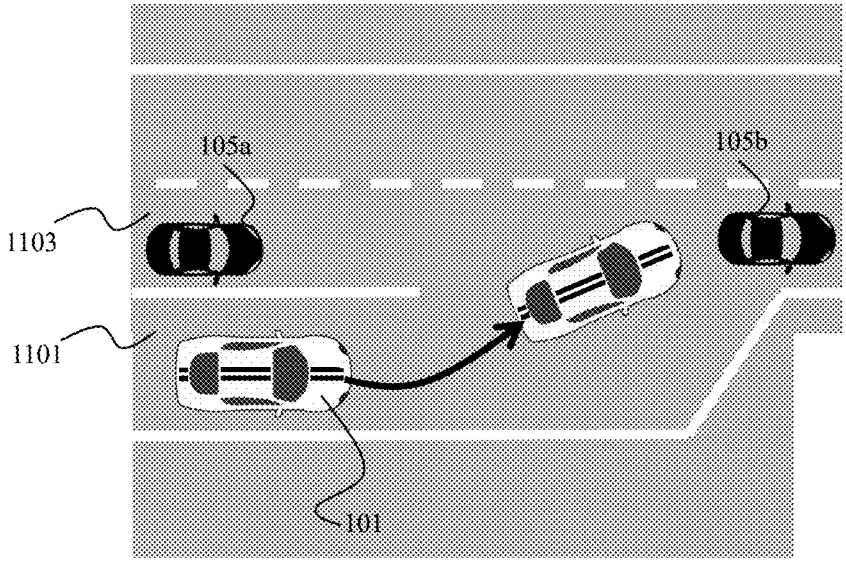
FIGS. 11A-11F illustrate the EV merging from a side road into a main road with traffic including the OAs, according to some embodiments of the present disclosure.
Figure 11B:
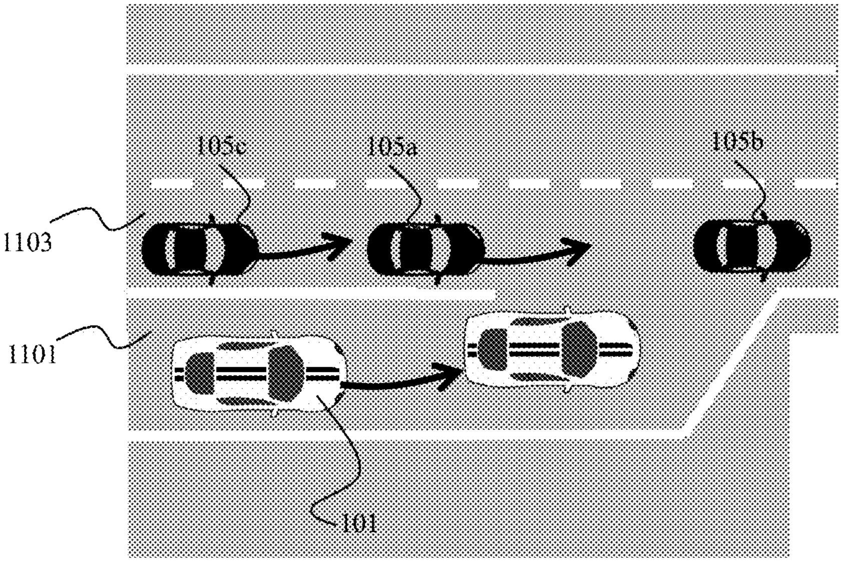

FIGS. 11A-11F illustrate the EV 101 merging from a side road 1101 into a main road 1103 with traffic including the OAs 105*a*, 105*b*, and 105*c*, according to some embodiments of the present disclosure. The EV 101 is integrated or communicatively coupled with the controller 109. If the traffic is scarce, as shown in FIG. 11A. it is enough for the EV 101 to stay away from the traffic, and wait the moment when there is enough space to merge in. On the other hand, if the traffic is dense, as shown in FIG. 11B, then the EV 101 waits for a longer time until the traffic on the main road 1103 is spaced enough by itself.

Figure 11C:
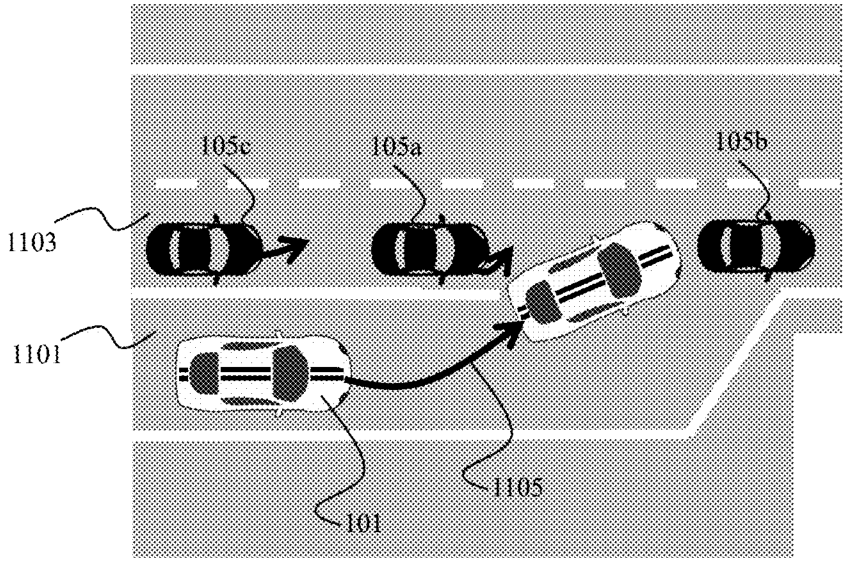
Figure 11D:
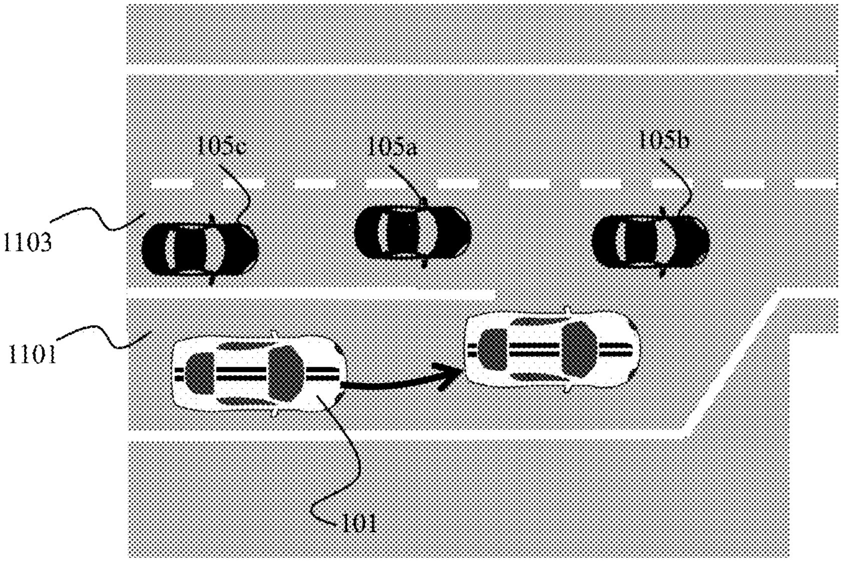
Figure 11E:
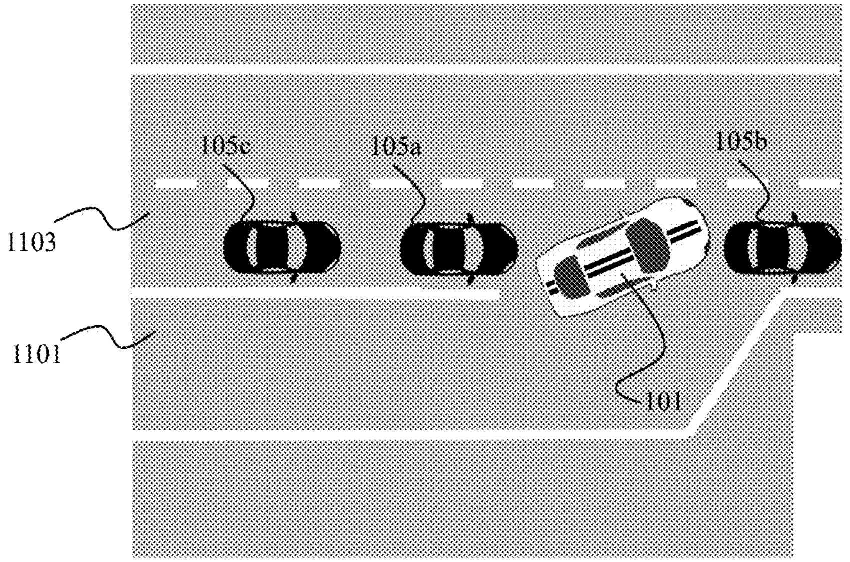
Figure 11F:
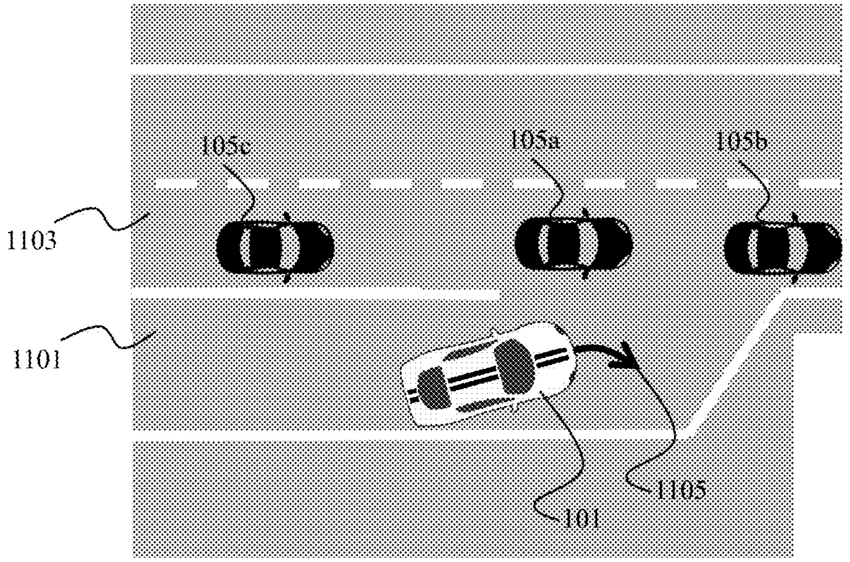

However, with the controller 109 of the present disclosure, the EV 101 can plan to merge, as shown in FIG. 11C, by accounting that the traffic makes room for it, by slowing down. The EV 101 makes a prediction on how the traffic responds to a trajectory 1105 of the EV 101. The traffic ignores the incoming EV 101 and not make a room for it, as shown in FIG. 11D, or the traffic slows down and make room for the EV 101, as shown in FIG. 11C. In the first case, the EV 101 does not start moving and, in the second case, the EV 101 starts moving. In a case where the prediction is correct, the traffic starts slowing and the EV 101 completes the merge, as shown in FIG. 11E. If the prediction is incorrect, the traffic does not slow down, and the EV 101 updates its trajectory 1105 by stopping and wait for some traffic to slow, to start moving again, as shown in FIG. 11F.

Figure 12:
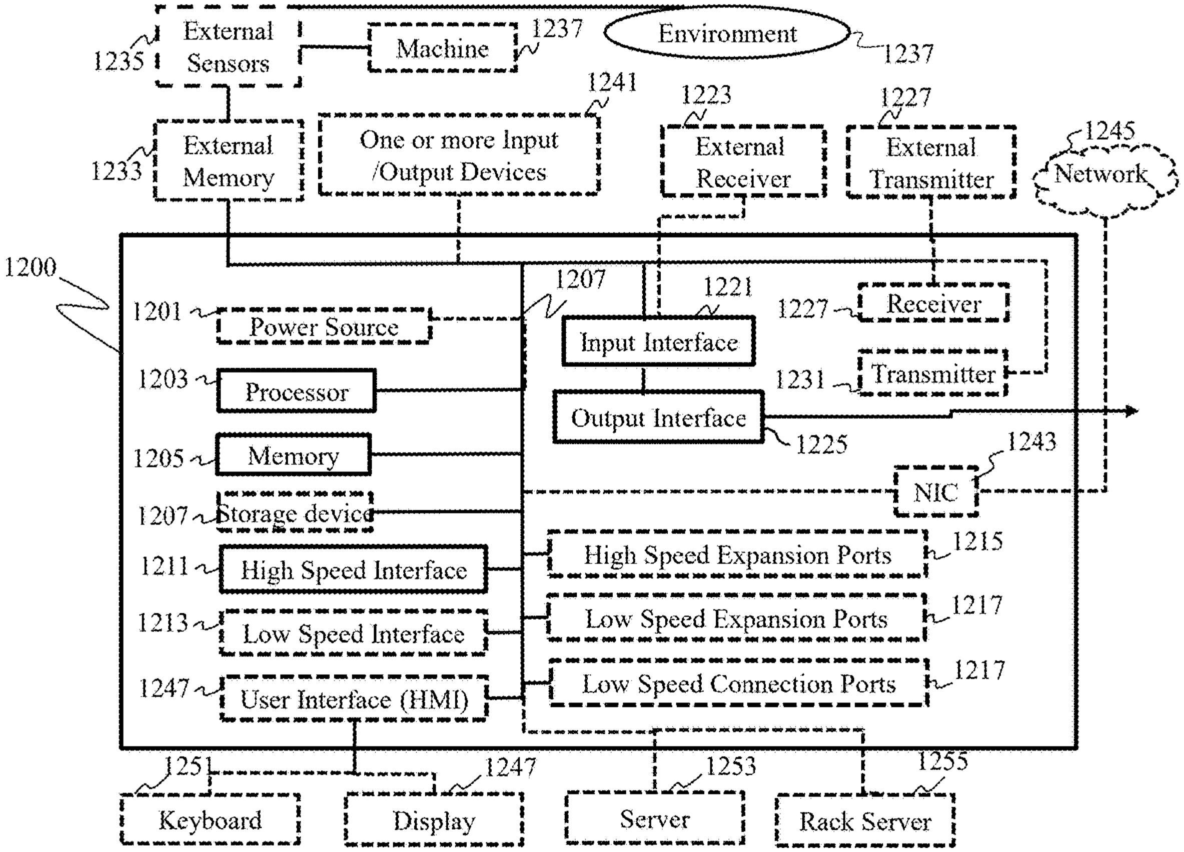
FIG. 12 is a schematic illustrating by non-limiting example a computing apparatus for implementing the methods and the systems of the present disclosure.

FIG. 12 is a schematic illustrating by non-limiting example a computing apparatus for implementing the methods and the systems of the present disclosure. The computing device 1200 can include a power source 1201, a processor 1203, a memory 1205, a storage device 1207, all connected to a bus 1209. Further, a high-speed interface 1211, a low-speed interface 1213, high-speed expansion ports 1215 and low speed connection ports 1217, can be connected to the bus 1209. In addition, a low-speed expansion port 1219 is in connection with the bus 1209. Further, an input interface 1221 can be connected via the bus 1209 to an external receiver 1223 and an output interface 1225. A receiver 1227 can be connected to an external transmitter 1229 and a transmitter 1231 via the bus 1209. Also connected to the bus 1209 can be an external memory 1233, external sensors 1235, machine(s) 1237, and an environment 1239. Further, one or more external input/output devices 1241 can be connected to the bus 1209. A network interface controller (NIC) 1243 can be adapted to connect through the bus 1209 to a network 1245, wherein data or other data, among other things, can be rendered on a third-party display device, third party imaging device, and/or third-party printing device outside of the computer device 1200.

The memory 1205 can store instructions that are executable by the computer device 1200, historical data, and any data that can be utilized by the methods and systems of the present disclosure. The memory 1205 can include random access memory (RAM), read only memory (ROM), flash memory, or any other suitable memory systems. The memory 1205 can be a volatile memory unit or units, and/or a non-volatile memory unit or units. The memory 1205 may also be another form of computer-readable medium, such as a magnetic or optical disk.

The storage device 1207 can be adapted to store supplementary data and/or software modules used by the computer device 1200. For example, the storage device 1207 can store historical data and other related data as mentioned above regarding the present disclosure. Additionally, or alternatively, the storage device 1207 can store historical data like data as mentioned above regarding the present disclosure. The storage device 1207 can include a hard drive, an optical drive, a thumb-drive, an array of drives, or any combinations thereof. Further, the storage device 1207 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, the processor 1203), perform one or more methods, such as those described above.

The computing device 1200 can be linked through the bus 1209, optionally, to a display interface or user Interface (HMI) 1247 adapted to connect the computing device 1200 to a display device 1249 and a keyboard 1251, wherein the display device 1249 can include a computer monitor, camera, television, projector, or mobile device, among others. In some implementations, the computer device 1200 may include a printer interface to connect to a printing device, wherein the printing device can include a liquid inkjet printer, solid ink printer, large-scale commercial printer, thermal printer, UV printer, or dye-sublimation printer, among others.

The high-speed interface 1211 manages bandwidth-intensive operations for the computing device 1200, while the low-speed interface 1213 manages lower bandwidth-intensive operations. Such allocation of functions is an example only. In some implementations, the high-speed interface 1211 can be coupled to the memory 1205, the user interface (HMI) 1247, and to the keyboard 1251 and the display 1249 (e.g., through a graphics processor or accelerator), and to the high-speed expansion ports 1215, which may accept various expansion cards via the bus 1209. In an implementation, the low-speed interface 1213 is coupled to the storage device 1207 and the low-speed expansion ports 1217, via the bus 1209. The low-speed expansion ports 1217, which may include various communication ports (e.g., USB, Bluetooth, Ethernet, wireless Ethernet) may be coupled to the one or more input/output devices 1241. The computing device 1200 may be connected to a server 1253 and a rack server 1255. The computing device 1200 may be implemented in several different forms. For example, the computing device 1200 may be implemented as part of the rack server 1255.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. A controller for controlling an ego vehicle (EV) in an environment surrounding the EV and including at least one other agent (OA) representing a moving object, the controller comprising: a processor coupled with instructions stored in a memory, wherein the stored instructions, when executed by the processor, cause the controller to:

- determine jointly and interdependently joint trajectories of the EV and the at least one OA by solving an optimization problem including a cost function and a safety constraint that collectively characterize a reaction of the at least one OA to motion of the EV, wherein the cost function depends on one or more parameters representing performance preferences and safety preferences of the at least one OA;
- control the motion of the EV based on the joint trajectory of the EV;
- predict motion of the at least one OA based on the joint trajectory of the at least one OA and current values of the one or more parameters;
- observe motion of the at least one OA;
- determine a difference between the observed motion and the predicted motion of the at least one OA; and
- update the one or more parameters based on the difference for future determinations of joint trajectories.

2. The controller of claim 1, wherein the processor is configured to:

- collect a state of the EV and a state of the at least one OA; and
- determine an independent trajectory for the EV independent from motion of the at least one OA based on the state of the EV, and an independent trajectory for the at least one OA independent from motion of the EV based on the state of the at least one OA, wherein the cost function produces a higher cost if one or both of the EV and the at least one OA deviate from the independent trajectories, and wherein a cost of deviation of the EV is different than a cost of deviation of the at least one OA.

3. The controller of claim 1, wherein the environment includes a first OA and a second OA, such that the cost function penalizes a difference of a first joint trajectory of the first OA from a first independent trajectory of the first OA with a first cost of deviation and penalizes a difference of a second joint trajectory of the second OA from a second independent trajectory of the second OA with a second cost of deviation, wherein the first cost of deviation is different from the second cost of deviation.

4. The controller of claim 3, wherein the processor is further configured to determine the first cost of deviation and the second cost of deviation based on a type and behavior of the first OA and the second OA.

5. The controller of claim 3, wherein the cost function is optimized subject to a first constraint on a mutual position between the EV and the first OA and a second constraint on a mutual position between the EV and the second OA, and wherein the first constraint is different from the second constraint.

6. The controller of claim 2, wherein the processor is further configured to update the cost of deviation of the at least one OA based on a difference between the joint trajectory of the at least one OA and the observed trajectory of the at least one OA.

7. The controller of claim 6, wherein the cost function is optimized subject to a safety constraint on a mutual position between the EV and the at least one OA, and wherein the processor is further configured to update the safety constraint based on the difference between the joint trajectory of the at least one OA and the observed trajectory of the at least one OA.

8. The controller of claim 7, wherein the safety constraint is obtained by a control barrier function constraint that includes values of states and values of first-order derivatives of a state of the EV and a state of the at least one OA.

9. The controller of claim 7, wherein the processor is further configured to modify the safety constraint based on a confidence on the safety constraint, such that when the cost function is subject to the modified safety constraint, a percentage fraction of realizations of the joint trajectories that satisfy the safety constraint with uncertainty in the safety constraint is larger than a pre-assigned percentage fraction.

10. The controller of claim 1, wherein the cost function includes a motion objective of the EV and a weighted motion objective of the at least one OA.

11. The controller of claim 10, wherein a weight of the weighted motion objective of the at least one OA depends on a weight matrix that is based on a latent parameter of the at least one OA.

12. The controller of claim 11, wherein the processor is further configured to compute the latent parameter of the at least one OA based on the observed trajectory of the at least one OA and the joint trajectory of the at least one OA.

13. A method for controlling an ego vehicle (EV) in an environment surrounding the EV and including at least one other agent (OA) representing a moving object, the method comprising:

determining jointly and interdependently joint trajectories of the EV and the at least one OA by solving an optimization problem including a cost function and a safety constraint that collectively characterize a reaction of the at least one OA to motion of the EV, wherein the cost function depends on one or more parameters representing performance preferences and safety preferences of the at least one OA;

controlling the motion of the EV based on the joint trajectory of the EV;

predicting motion of the at least one OA based on the joint trajectory of the at least one OA and current values of the one or more parameters;

observing motion of the at least one OA;

determining a difference between the observed motion and the predicted motion of the at least one OA; and updating the one or more parameters based on the difference for future determinations of joint trajectories.

14. The method of claim 13, wherein the method further comprises:

collecting a state of the EV and a state of the at least one OA; and determining an independent trajectory for the EV independent from motion of the at least one OA based on the state of the EV, and an independent trajectory for the at least one OA independent from motion of the EV based on the state of the at least one OA, wherein the cost function produces a higher cost if one or both of the EV and the at least one OA deviate from the independent trajectories, and wherein a cost of deviation of the EV is different than a cost of deviation of the at least one OA.

15. The method of claim 13, wherein the environment includes a first OA and a second OA, such that the cost function penalizes a difference of a first joint trajectory of the first OA from a first independent trajectory of the first OA with a first cost of deviation and penalizes a difference of a second joint trajectory of the second OA from a second independent trajectory of the second OA with a second cost of deviation, wherein the first cost of deviation is different from the second cost of deviation.

16. The method of claim 15, wherein one or a combination of the first cost of deviation and the second cost of deviation is collected over a wireless communication channel.

17. The method of claim 15, wherein the method further comprises determining the first cost of deviation and the second cost of deviation based on a type and behavior of the first OA and the second OA.

18. The method of claim 15, wherein the cost function is optimized subject to a first constraint on a mutual position between the EV and the first OA and a second constraint on a mutual position between the EV and the second OA, and wherein the first constraint is different from the second constraint.

19. The method of claim 14, wherein the method further comprises updating the cost of deviation of the at least one OA based on a difference between the joint trajectory of the at least one OA and the observed trajectory of the at least one OA.

20. A non-transitory computer-readable storage medium embodied thereon a program executable by a processor for performing a method for controlling an ego vehicle (EV) in an environment surrounding the EV and including at least one other agent (OA) representing a moving object, the method comprising:

determining jointly and interdependently joint trajectories of the EV and the at least one OA by solving an optimization problem including a cost function and a safety constraint that collectively characterize a reaction of the at least one OA to motion of the EV, wherein the cost function depends on one or more parameters representing performance preferences and safety preferences of the at least one OA;

controlling the motion of the EV based on the joint trajectory of the EV;

predicting motion of the at least one OA based on the joint trajectory of the at least one OA and current values of the one or more parameters;

observing motion of the at least one OA;

determining a difference between the observed motion and the predicted motion of the at least one OA; and updating the one or more parameters based on the difference for future determinations of joint trajectories.

* * * * *